United States Patent

Chickering et al.

[11] Patent Number: 6,154,736
[45] Date of Patent: Nov. 28, 2000

[54] BELIEF NETWORKS WITH DECISION GRAPHS

[75] Inventors: David Maxwell Chickering, Redmond; David Heckerman, Bellevue; Christopher A. Meek, Kirkland, all of Wash.

[73] Assignee: Microsoft Corporation, Redmond, Wash.

[21] Appl. No.: 08/902,759

[22] Filed: Jul. 30, 1997

[51] Int. Cl.[7] ............................... G06N 5/00; G06N 5/02
[52] U.S. Cl. ................................................ 706/59; 706/45
[58] Field of Search .................................. 706/12, 46, 59, 706/61, 45

[56] References Cited

U.S. PATENT DOCUMENTS

| | | | |
|---|---|---|---|
| 5,696,884 | 12/1997 | Heckerman et al. | 706/61 |
| 5,704,017 | 12/1997 | Heckerman et al. | 706/12 |
| 5,704,018 | 12/1997 | Heckerman et al. | 395/75 |
| 5,715,374 | 2/1998 | Heckerman et al. | 706/46 |
| 5,802,256 | 9/1998 | Heckerman et al. | 706/59 |

OTHER PUBLICATIONS

Boutilier, Craig et al., "Context–Specific Independence in Bayesian Networks," Proceedings of the Twelfth Annual Conference on Uncertainty in Artificial Intelligence (UAI–96), Portland, Oregon, Aug. 1997, pp. 115–123.

Chickering, David Maxwell et al., "A Bayesian Approach to Learning Bayesian Networks with Local Structure," Technical Report MSR–TR–97–06, Microsoft Research, Redmond, Washington, Mar. 1997, pp. 1–22.

Friedman, Nir and Goldszmidt, Moises, "Discretizing Continuous Attributes While Learning Bayesian Networks," pp. 157–165.

Friedman, Nir and Goldszmidt, "Building Classifiers Using Bayesian Networks," pp. 1277–1284.

Friedman, Nir and Goldszmidt, "Learning Bayesian Networks with Local Structure," pp. 252–262.

Tukey, John W., *Exploratory Data Analysis*, Addison–Wesley Publishing Company, Inc., Redding, Massachusetts, 1977, preface and table of contents.

Zhaoyu Li; D'Ambrosio, B., A framework for ordering composite beliefs in belief networks, Systems, Man and Cybernetics, IEEE Transactions on, vol.: 25 2, Feb. 1995, pp: 243–255.

Dagum, P.; Chavez, R.M., Approximating probabilistic inference in Bayesian belief networks, Pattern Analysis and Machine Intelligence, IEEE Transactions on, vol.: 15 3, Mar. 1993, pp.: 246–255.

Sarkar, S., Modeling uncertainty using enhanced tree structures in expert systems, Systems, Man and Cybernetics, IEEE Transactions on, vol.: 25 4, Apr. 1995, pp.: 592–604.

Yiqun Gu; Peiris, D.R.; Crawford, J.W.; NcNicol, J.W.; Marshall, B.; Jefferies, R.A., An application of belief networks to future crop production, Artificial Intelligence for Applications, Jan. 1994., Proceedings of the Tenth Conference on, Jan. 1994, pp.: 3.

Abdelbar, A.M.; Hedetniemi, S.M., A parallel hybrid genetic algorithm simulated annealing approach to finding most probable explanations on Bayesian belief networks, Neural Networks, Jan. 1997., International Conference on, vol: 1, 1997, pp: 450–455, Jan. 1997.

(List continued on next page.)

*Primary Examiner*—Eric W. Stamber
*Assistant Examiner*—Wilbert L. Starks, Jr.
*Attorney, Agent, or Firm*—Michaelson & Wallace; Peter L. Michaelson

[57] ABSTRACT

An improved belief network is provided for assisting users in making decisions. The improved belief network utilizes a decision graph in each of its nodes to store the probabilities for that node. A decision graph is a much more flexible and efficient data structure for storing probabilities than either a tree or a table, because a decision graph can reflect any equivalence relationships between the probabilities and because leaf nodes having equivalent probabilities need not be duplicated. Additionally, by being able to reflect an equivalency relationship, multiple paths (or combinations of the parent values) refer to the same probability, which yields a more accurate probability.

41 Claims, 18 Drawing Sheets

OTHER PUBLICATIONS

Shang–Hua Wang; Hung–Tat Tsui, Dynamic structuring of belief networks in a hierarchical perceptual organization, Speech, Image Processing and Neural Networks, 1994. Proceedings, ISSIPNN '94., 1994 International Symposium on, 1994, pp.: 519–522 vol. 2, Jan. 1997.

Sarkar, S.; Murthy, I., Constructing efficient belief network structures with expert provided information, Knowledge and Data Engineering, IEEE Transactions on, vol.: 8 1, Feb. 1996, pp.: 134–143.

Deleu, J.; Beuscart, R.; Becquart, E.; Duhamel, A.; Comyn, G., Comparison of a probabilistic network and an expert system, Engineering in Medicine and Biology Society, Jan. 1988., Proceedings of the Annual International Conference of the IEEE, 1988, pp:.

Abramson, B.; Ng, K.–C., Toward an art and science of knowledge engineering: a case for belief networks, Knowledge and Data Engineering, IEEE Transactions on, vol.: 5 4, Aug. 1993, pp.: 705–.

Low, B.T., Neural–Logic Belief Networks–A tool for knowledge representation and reasoning, Tools with Artificial Intelligence, Jan. 1993. TAI '93. Proceedings., Fifth Interntional Conference on, Jan. 1993, pp.: 34–37.

Saxena, N.; Sarkar, S.; Ranganathan, N., Mapping and parallel implementation of Bayesian belief networks Parallel and Distributed Processing, 1996., Eighth IEEE Symposium on, Jan. 1996, pp.: 608–611.

Suzuki, J., An extension on learning Bayesian belief networks based on MDL principle, Information Theory, 1995. Proceedings., 1995 IEEE International Symposium on, Jan. 1995, p.: 232.

Bellazzi, R.; Quaglini, S.; Berzuini, C., GAMEES II: an environment for building probabilistic expert systems based on arrays of Bayesian belief networks, Computer–Based Medical Systems, 1992. Proceedings., Fifth Annual IEEE Symposium on, Jan. 1992, p.: 5.

Gebhardt, J; Kruse, R., Learning possibilistic networks from data, Fuzzy Systems, Feb. 1995. International Joint Conference of the Fourth IEEE International Conference on Fuzzy Systems and The Second International Fuzzy Engineering Symposium., Proceedings of, Jan. 1995.

Wang, Shang–Hua et al., Dynamic Structuring of Belief Networks in a Heirarchical Perceptual Organization., ISSIPNN '94. 1994 International Symposium on Speech, Image Processing, and Neural Networks Proceedings (Cat. No. 94TH0638–7) New York, NY, IEEE, 199, Apr. 1994.

Breese, J.S.; Heckerman, D., Decision–theoretic case–based reasoning, Systems, Man and Cybernetics, Part A, IEEE Transactions on, vol.: 26 6, Nov. 1996, pp.: 838–842.

Heckerman, D.; Breese, J.S., Causal independence for probability assessment and inference using Bayesian networks, Systems, Man and Cybernetics, Part A, IEEE Transactions on, vol.: 26 6, Nov. 1996, pp.: 838–842.

| User | Age | Sex | Business | Travel |
|------|-----|-----|----------|--------|
| User 1 | 1 | Male | No | Yes |
| User 2 | 4 | Female | Yes | No |
| . . . | . . . | . . . | . . . | . . . |
| User N | 3 | Male | Yes | Yes |

*Fig. 7*

BELIEF NETWORKS WITH DECISION GRAPHS

TECHNICAL FIELD

The present invention relates generally to data processing systems and, more particularly, to belief networks having decision graphs.

BACKGROUND OF THE INVENTION

A belief network is a representation of the probabilistic relationships among distinctions about the world. A distinction in a belief network can take on a set of values and are thus called variables. A belief network is expressed as an acyclic, directed graph, where the variables correspond to nodes and where the relationships between the nodes correspond to arcs. FIG. 1 depicts an example belief network 101. The belief network 101 contains three variables, $x_1$, $x_2$, and $x_3$, which are represented by nodes 102, 106, and 110, respectively. Also, the example belief network 101 contains two arcs 104 and 108. Associated with each variable in a belief network is a set of probability distributions. Using conditional probability notation, the set of probability distributions for a variable can be denoted by $p(x_i|pa(x_i))$, where "p" refers to the probability distribution, and where "$pa(x_i)$" denotes the parents of variable $x_i$. Thus, this expression reads as follows, "the probability distribution for variable $x_i$ given the parents of $x_i$." For example, $x_1$ is the parent of $x_2$. The probability distributions specify the strength of the relationships between variables. For instance, if $x_1$ has two states (true and false), then associated with $x_1$ is a single probability distribution $p(x_1)$ and associated with $x_2$ are two probability distributions $p(x_2|x_1=t)$ and $p(x_2|x_1=f)$.

An important aspect of belief networks is the concept of dependence. Sets of variables x and y are said to be conditionally independent, given a set of variables z, if the probability distribution for x given z does not depend on y. That is, if $p(x|z,y)=p(x|z)$, x and y are conditionally independent given z. If z is empty, however, x and y are said to be "independent" as opposed to conditionally independent. If x and y are not conditionally independent given z, then x and y are said to be conditionally dependent given z.

The arcs in a belief network convey dependence between nodes. When a belief network has an arc from a first node to a second node, the probability distribution of the second node depends upon the value of the first node. For example, belief network 101 contains an arc from node 102 to node 106, and therefore, node 106 is said to be dependent on node 102. Just like the presence of arcs in a belief network conveys dependence, the absence of arcs in a belief network conveys conditional independence. For example, node 102 and node 110 are conditionally independent given node 106. That is, the values of nodes 102 and 110 are conditionally independent if the value of node 106 is known, the condition being the observation of node 106. However, two variables indirectly connected through intermediate variables are dependent given lack of knowledge of the values ("states") of the intermediate variables. Therefore, if the value for $x_2$ is unknown, $x_1$ and $x_3$ are dependent.

FIG. 2 depicts an example belief network for troubleshooting automobile problems. The belief network of FIG. 2 contains many variables 202–234, which relate to whether an automobile will work properly, and arcs 236–268 connecting the variables. A few examples of the relationships between the variables follow: For the radio 214 to work properly, there must be battery power 212 (arc 246). Battery power 212, in turn, depends upon the battery working properly 208 and a charge 210 (arcs 242 and 244). The battery working properly 208 depends upon the battery age 202 (arc 236), and the charge 210 of the battery depends upon both the alternator 204 working properly (arc 238) and the fan belt 206 being intact (arc 240).

The automobile troubleshooting belief network also provides a number of examples of conditional independence and conditional dependence. Specifically, the nodes operation of the lights 216 and battery power 212 are dependent, and the nodes operation of the lights 216 and operation of the radio 214 are conditionally independent given battery power. The concepts of conditional dependence and conditional independence can be expressed using conditional probability notation. For example, the operation of the lights 216 is conditionally independent of the radio 214 given battery power. Therefore, the probability of the lights 216 working properly given both the battery power 212 and the radio 214 is equal to the probability of the lights working properly given the battery power alone: P(Lights|Battery Power, Radio)=P(Lights|Battery Power). An example of a conditional dependence relationship is the probability of the lights working properly 216 is conditionally dependent on the radio 214 given the battery 208. Therefore, the probability of the lights 216 working properly given both the radio 214 and the battery 208 is not equal to the probability of the lights given the battery alone: P(Lights|Radio, Battery)≠P(Lights|Battery).

There are two conventional approaches for constructing belief networks. Using the first approach ("the knowledge-based approach"), a person known as a knowledge engineer first interviews an expert in a given field to obtain the knowledge of the expert about the expert's field of expertise. During this interview, the knowledge engineer and the expert first determine the distinctions of the world that are important for decision making in the expert's field of expertise. These distinctions correspond to the variables of the domain of the belief network. The "domain" of a belief network is the set of all variables in the belief network. Then, to complete the belief network, the knowledge engineer and the expert determine the dependencies among the variables (the arcs) and the probability distributions that quantify the strengths of the dependencies.

In the second conventional approach for constructing a belief network ("the data-based approach"), the knowledge engineer and the expert first determine the variables of the domain. Next, data is accumulated for these variables, and an algorithm is applied that creates a belief network from this data. The accumulated data comes from real-world instances of the domain, which are real-world instances of decision making in a given field.

A method for generating a belief network that is an improvement over these conventional approaches is described in pending U.S. patent application Ser. No. 08/240,019 (now U.S. Pat. No. 5,704,018 issued Dec. 30, 1997), entitled "Generating Improved Belief Networks," assigned to a common assignee, which is hereby incorporated by reference. This improved method uses both expert knowledge and accumulated data to generate a belief network.

Regardless of the approach used for constructing a belief network, after the belief network has been constructed, the belief network becomes the engine for a decision-support system. The belief network is converted into a computer-readable form, such as a file, and input into a computer system. Then, the computer system uses the belief network to perform probabilistic inference by determining the probabilities of variable states given observations, to determine the benefits of performing tests, and ultimately to recommend or render a decision. Consider an example where a decision-support system uses the belief network of FIG. 2 to troubleshoot automobile problems. If the engine for an automobile did not start, the decision-support system may request an observation of whether there was gas 224, whether the fuel pump 226 was in working order by performing a test, whether the fuel line 228 was obstructed, whether the distributor 230 was working, and whether the spark plugs 232 were working. While the observations and tests are being performed, the belief network assists in determining which variable should be observed next.

Although belief networks are quite useful in decision-support systems, belief networks require a significant amount of storage. For example, in the belief network 300 of FIG. 3A, the value of nodes x and y causally influences the value of node z. In this example, nodes x, y, and z have binary values of either 0 or 1. As such, node z maintains a set of four probabilities, one probability for each combination of the values of x and y, and stores these probabilities into a table 320 as shown in FIG. 3B. When performing probabilistic inference, it is the probabilities in table 320 that are accessed. As can be seen from table 320, only the probabilities for z equaling 0 are stored; the probabilities for z equaling 1 need not be stored as they are easily derived by subtracting the probability of when z equals 0 from 1. As the number of parents of a node increases, the table in the node that stores the probabilities becomes multiplicatively large and requires a significant amount of storage. For example, a node having binary values with 10 parents that also have binary values requires a table consisting of 1,024 entries. And, if either the node or one of its parents has more values than a binary variable, the number of probabilities in the table increases multiplicatively.

In addition to requiring a significant amount of storage, when performing probabilistic inference, the table 320 needs to be accessed and a look-up performed to obtain the appropriate probability for the given values of the parent nodes. Since the table containing the probabilities may be quite large, the look-up in such a table requires a significant amount of processing time. That is, if the probability is stored in the $n^{th}$ entry, n operations need to be performed to locate the entry.

To improve the storage of probabilities in a belief network node, some conventional systems use a tree data structure. A tree data structure is an acyclic, undirected graph where each vertex is connected to each other vertex via a single path. The graph is acyclic in that there is no path that both emanates from a vertex and returns to the same vertex, where each edge in the path is traversed only once. FIG. 3C depicts an example tree data structure 330 that stores into its leaf vertices 336–342 the probabilities shown in table 320 of FIG. 3B. Assuming that a decision-support system performs probabilistic inference with x's value being 0 and y's value being 1, the following steps occur to access the appropriate probability in the tree data structure 330: First, the root vertex 332, vertex x, is accessed, and its value determines the edge or branch to be traversed. In this example, x's value is 0, so edge 344 is traversed to vertex 334, which is vertex y. Second, after reaching vertex y, the value for this vertex determines which edge is traversed to the next vertex. In this example, the value for vertex y is 1, so edge 346 is traversed to vertex 338, which is a leaf vertex. Finally, after reaching the leaf vertex 338, which stores the probability for z equaling 0 when x=0 and y=1, the appropriate probability can be accessed.

As compared to a table, a tree is a more efficient way of storing probabilities in a node of a belief network, because it requires less space. However, tree data structures are inflexible and do not adequately represent all of the relationships between nodes. For example, because of the acyclic nature of tree data structures, a tree cannot be used to indicate some types of equality relationships where multiple combinations of the values of the parent vertices have the same probability (i.e., refer to the same leaf vertex). This inflexibility requires that multiple vertices must sometimes store the same probabilities, which is wasteful. It is thus desirable to improve belief networks.

SUMMARY OF THE INVENTION

An improved belief network is provided for assisting users in making decisions. The improved belief network utilizes a decision graph in each of its nodes to store the probabilities for that node. A decision graph is a much more flexible and efficient data structure for storing probabilities than either a tree or a table, because a decision graph can reflect any equivalence relationship between the probabilities and because leaf nodes having equivalent probabilities need not be duplicated. Additionally, by being able to reflect an equivalency relationship, multiple paths (or combinations of the parent values) can refer to the same probability, which yields a more accurate probability when the belief network was constructed to reflect cases. A case is a collection of values for the nodes of the belief network that represents real-world decisions made in a field of decision making. For example, if there are 8 possible combinations of the parent nodes' values, if one probability is stored for each combination, and if the belief network was created using a database of 16 cases, the ratio of cases to probabilities is 2 to 1. In other words, each probability was created based on two data points on average. However, if the number of probabilities stored is reduced such that more than one combination refers to a probability, the ratio of cases to probabilities improves so that the probability becomes more accurate given the data. That is, some of the probabilities will be based on an increased number of data points, which produces more accurate probabilities.

In accordance with a first aspect of the present invention, a method is provided in a computer system having a belief network with nodes and arcs indicating relationships between the nodes. Each node has a decision graph containing probabilities. This method receives an observation for a first of the nodes of the belief network and accesses the decision graph of a second of the nodes to perform probabilistic inference using the decision graph and the observation.

In accordance with a second aspect of the present invention, a method in a computer system is provided for scoring a belief network having nodes and arcs indicating relationships between the nodes. The belief network provides decision support for a user in a field of decision making. A plurality of the nodes of the belief network have decision graphs containing probabilities for rendering inferences when given an observation for another node. The method accesses a database having observations for the nodes of the belief network representing instances of real-world decisions made in the field of decision making. Furthermore, the method scores the decision graphs in each node for goodness at reflecting data in the database.

In accordance with a third aspect of the present invention, a method is provided in a computer system having a belief network with nodes and arcs indicating relationships between the nodes. Each node has a decision graph containing probabilities for rendering inferences. This method scores the decision graphs in the nodes of the belief network to determine goodness at rendering inferences and adjusts the decision graph in at least one of the nodes of the belief network to improve the score of the decision graph.

In accordance with a fourth aspect of the present invention, a computer-readable memory device is provided that contains a data structure representing a belief network that comprises nodes and arcs connecting the nodes. The belief network is for use in assisting the user in rendering a decision. The nodes of the belief network contain a decision graph with leaf nodes containing probabilities, and the decision graph is used for accessing the probabilities within the leaf nodes to perform probabilistic inference.

In accordance with a fifth aspect of the present invention, a method is provided in a computer system for assisting a user in making a decision. This method receives a graph data structure with nodes and arcs indicating relationships between the nodes. The graph data structure has a cycle, and each node has a probability. Furthermore, this method receives an observation for one of the nodes and performs probabilistic inference by accessing the probabilities in the graph data structure.

BRIEF DESCRIPTION OF THE DRAWINGS

FIG. 7 depicts a more detailed diagram of the database of FIG. 6.

DETAILED DESCRIPTION OF THE INVENTION

Figure 1:
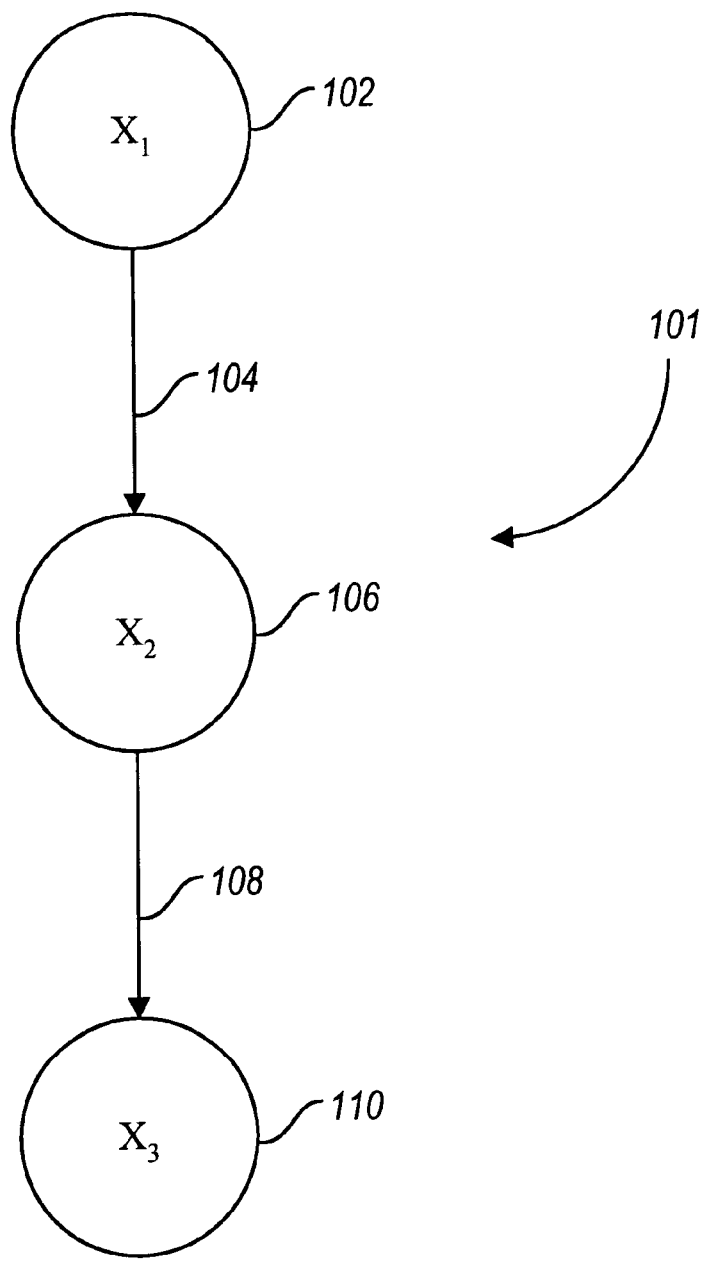
FIG. 1 depicts a conventional belief network.
Figure 2:
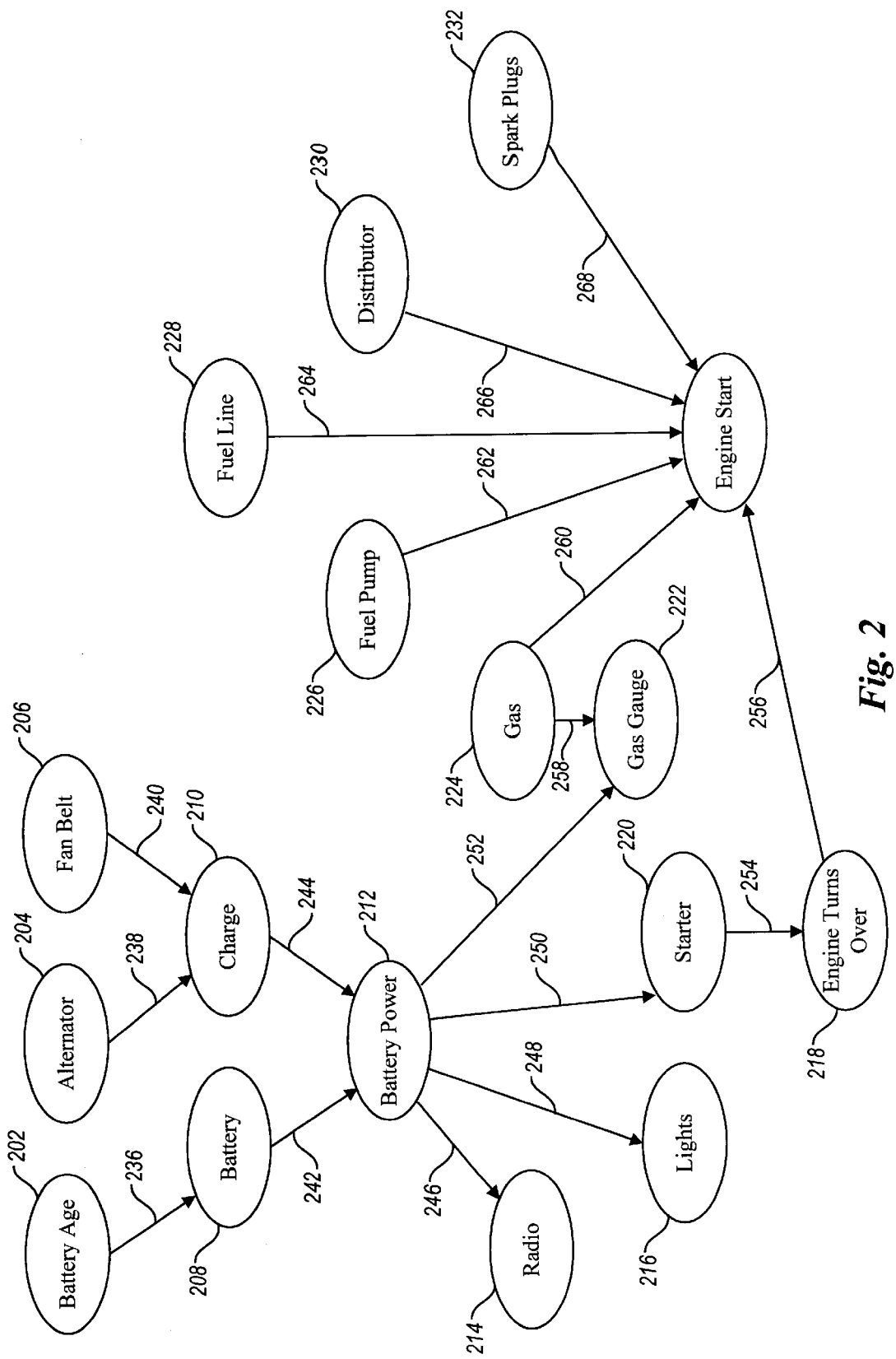
FIG. 2 depicts a conventional belief network for troubleshooting automobile problems.
Figure 3A:
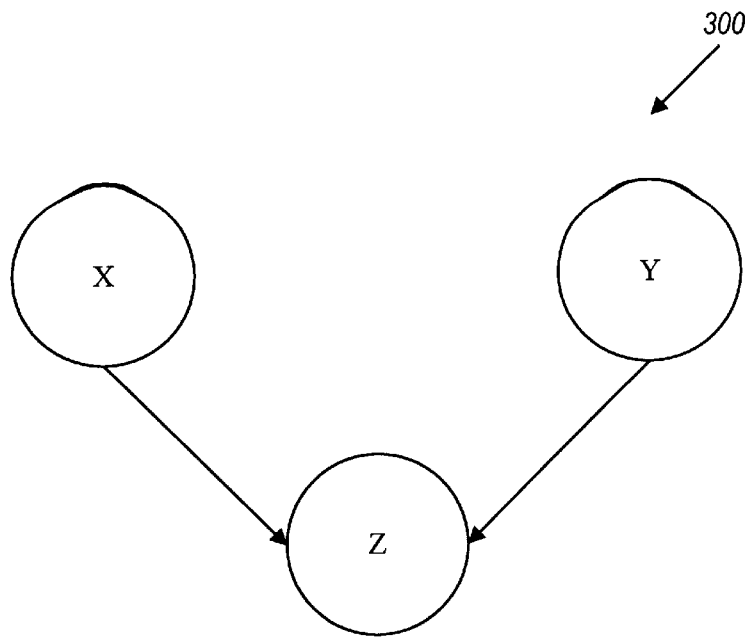
FIG. 3A depicts a conventional belief network.
Figure 3B:
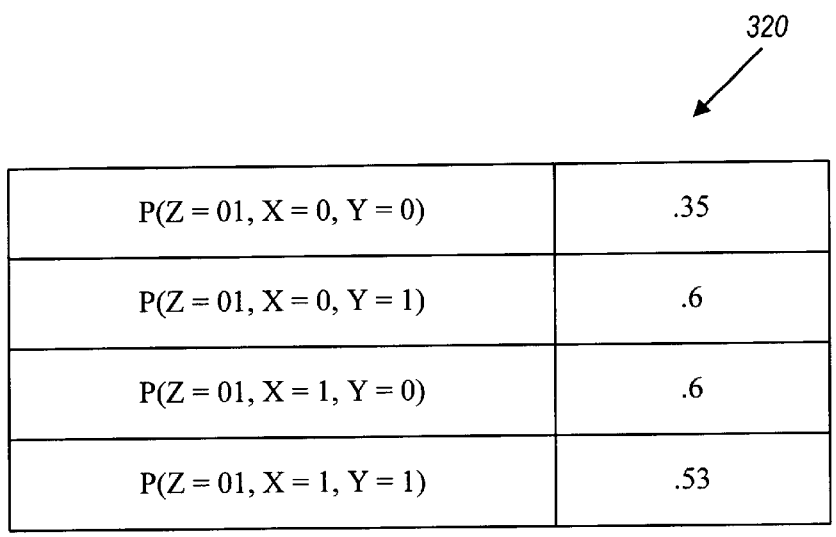
FIG. 3B depicts a table containing the probabilities for one of the nodes of the conventional belief network of FIG. 3A.
Figure 3C:
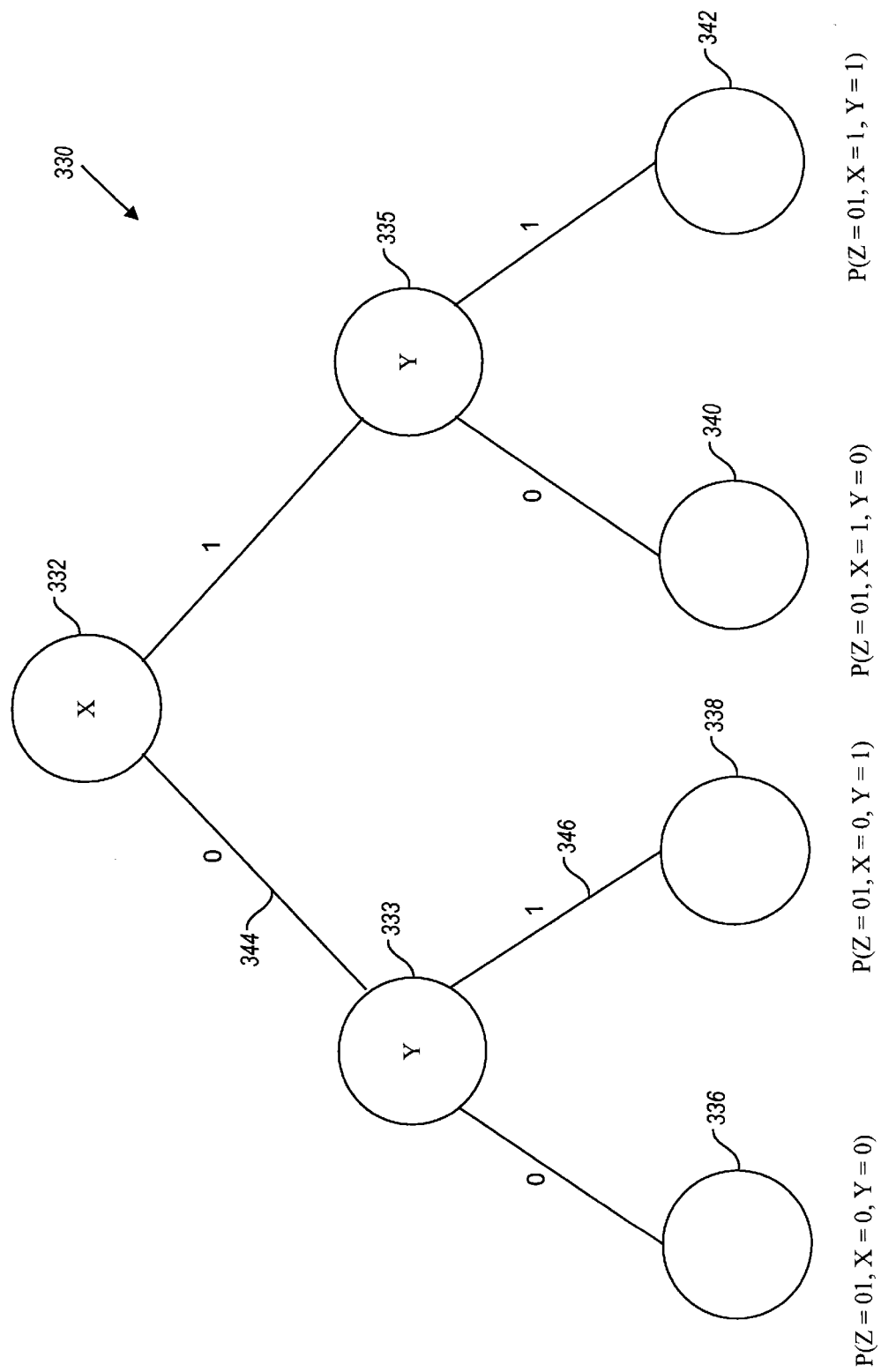
FIG. 3C depicts a tree data structure containing the probabilities for one of the nodes of the belief network of FIG. 3A.
Figure 4:
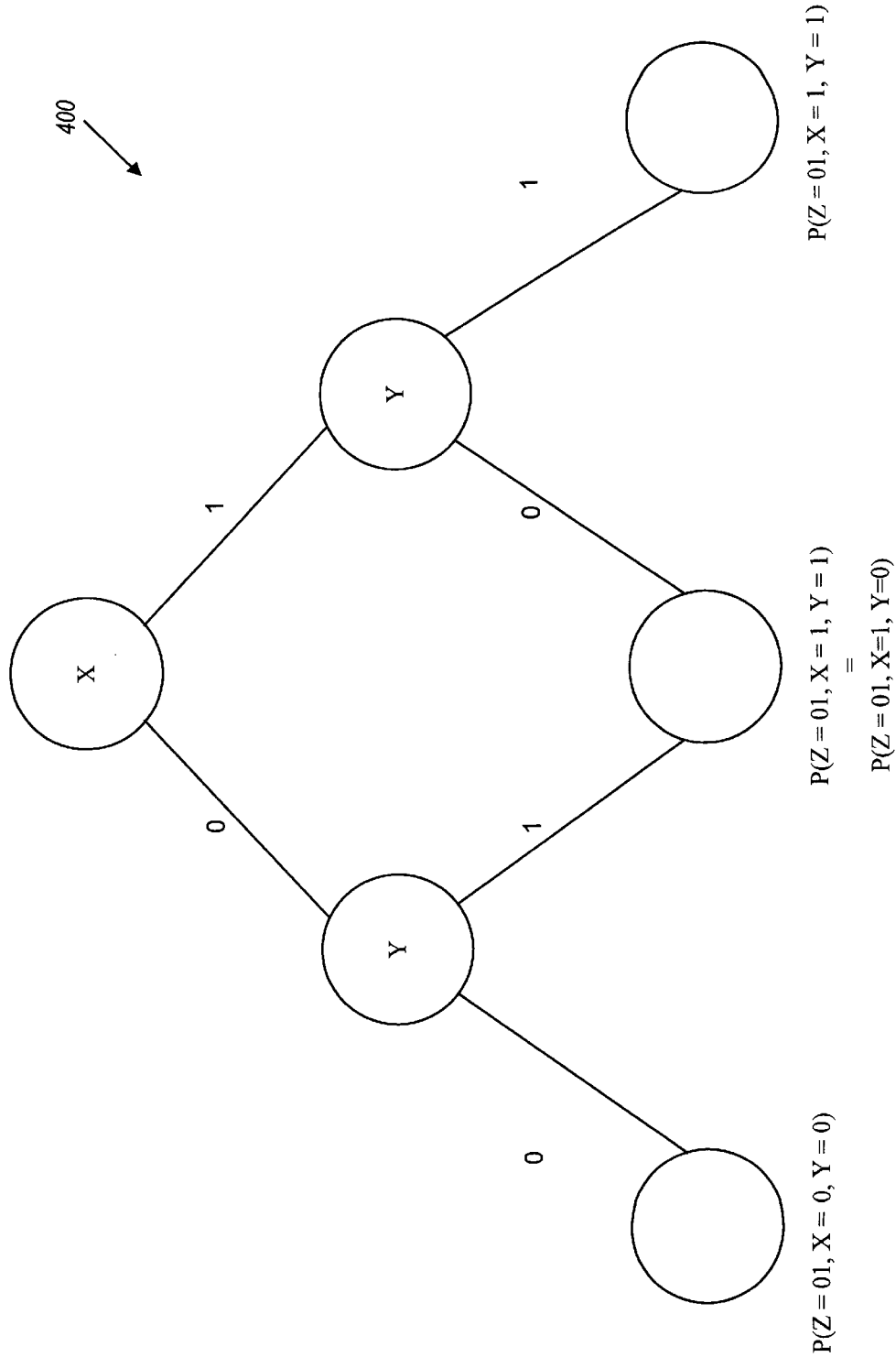
FIG. 4 depicts a decision graph data structure as used by the belief network of an exemplary embodiment of the present invention.

An exemplary embodiment of the present invention utilizes a decision graph in each of the nodes of a belief network to store the probabilities for that node. A decision graph is an undirected graph data structure where each vertex is connected to every other vertex via a path and where each leaf vertex may have more than one path leading into it, which forms a cycle. An example decision graph 400 is depicted in FIG. 4. This decision graph 400 is for a node z of a belief network where node z has parents x and y. As can be seen from decision graph 400, it contains one root vertex and only three leaf vertices, because one of the leaf vertices contains a probability for two sets of values: where x equals 0 and y equals 1, and where x equals 1 and y equals 0.

A decision graph is a much more flexible and efficient data structure for storing probabilities than either a tree or a table, because a decision graph can reflect any equivalence relationship between the probabilities and because leaf vertices having equivalent probabilities need not be duplicated. Additionally, by being able to reflect an equivalency relationship, multiple paths (or combinations of the parent values) can refer to the same probability, which yields a more accurate probability. For example, if there are 8 possible combinations of the parent vertices' values, if one probability is stored for each combination, and if the belief network was created using a database of 16 cases, the ratio of cases to probabilities is 2 to 1. A case is a collection of values for the nodes of the belief network (and, consequently, the vertices of the decision graph) that represents real-world decisions made in a field of decision making. In other words, each probability was created using two data points on average. However, if the number of probabilities stored is reduced such that more than one combination refers to a probability, the ratio of cases to probabilities improves so that the probability becomes more accurate given the data. That is, some of the probabilities are based on an increased number of data points, which produces more accurate probabilities.

Overview

An exemplary embodiment of the present invention receives a belief network from an expert in a field of decision making. By providing this belief network, the expert has identified the variables that are relevant to the particular field of decision making. The expert also provides an equivalent sample size, which is the equivalent number of times the expert has provided decision-support in the field of expertise (e.g., the number of times that an automobile mechanic has diagnosed a particular automobile problem). Additionally, the exemplary embodiment receives a database containing many cases of real-world instances of decisions made in the field of decision making (e.g., the service log at an automobile service station). After receiving this information, the exemplary embodiment creates initial decision graphs for the nodes of the belief network and then adjusts the decision graphs to better reflect the data in the database; this process is known as learning. During the learning process, the decision graphs are scored to determine goodness at reflecting the data in the database, and a number of candidate decision graphs are generated for each node by making adjustments to the decision graphs contained in each node. These candidate decision graphs are then scored, and the candidate decision graph with the best score (i.e., the score that improves the most) is stored for each node. After storing the decision graph with the best score into each node, the belief network is scored for how well all decision graphs reflect the data, and the belief network is then updated to improve its score. The adjustments to the belief network include adding arcs between the nodes to reflect additional relationships that were identified during the learning process. The learning process continues until the belief network with the best possible score is produced.

After the learning process is completed, the resulting belief network can be used to perform probabilistic inference so that the belief network can assist a user in making a decision. For example, the belief network can be used in various systems as described in pending U.S. patent application Ser. No. 08/267,798, (now U.S. Pat. No. 5,715,374 issued Feb. 3, 1998); entitled "Method and System for Case-Based Reasoning Utilizing a Belief Network" and pending U.S. patent application Ser. No. 08/602,238, the '238 application (now U.S. Pat. No. 5,704,017 issued Dec. 30, 1997) entitled "Collaborative Filtering Utilizing a Belief Network," which are both assigned to a common assignee and which are both hereby incorporated by reference.

Figure 5A:
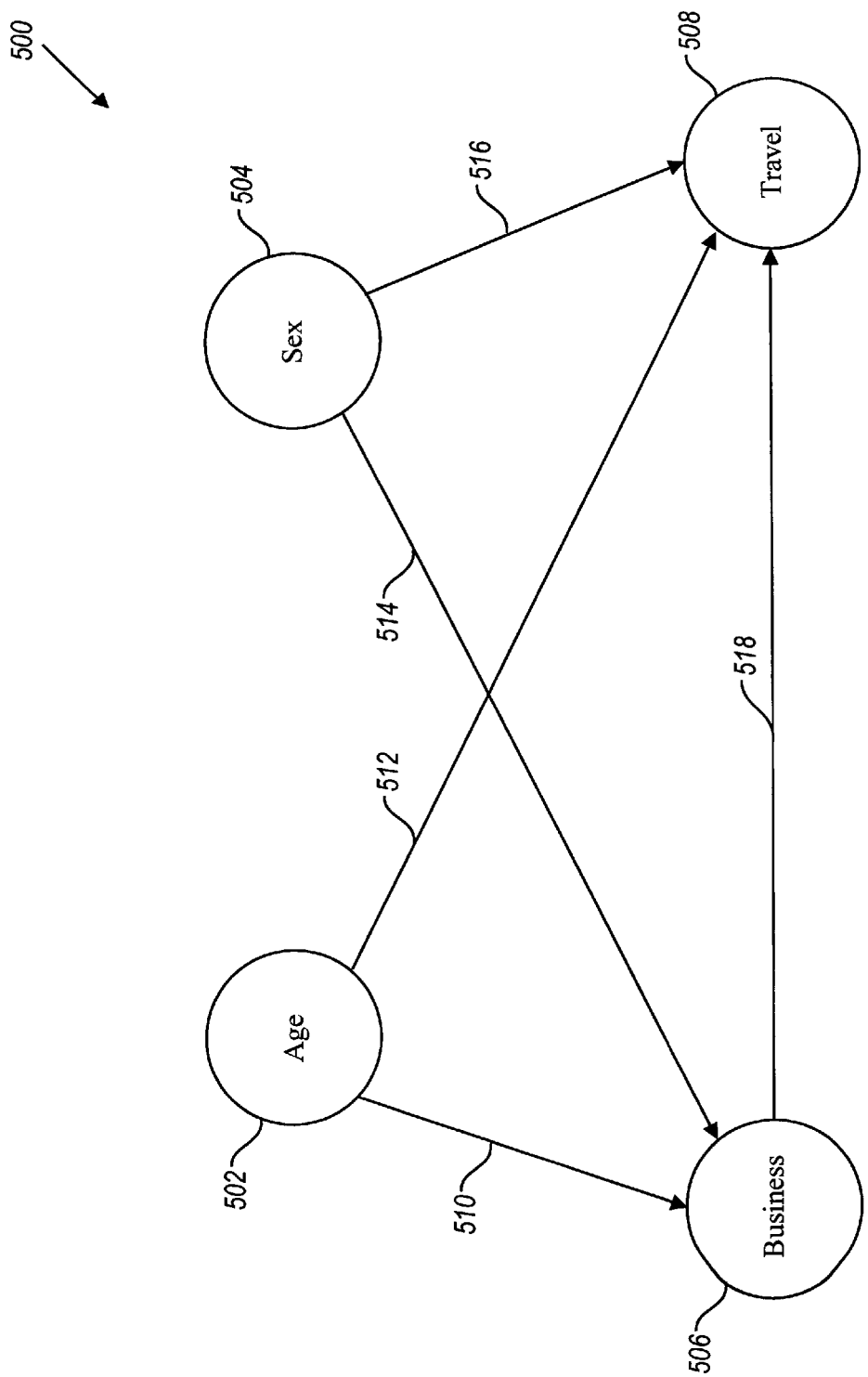
FIG. 5A depicts a belief network of an exemplary embodiment of the present invention.

Although the belief network of an exemplary embodiment can be used in numerous decision-support systems, it is described below with reference to a particular decision-support system for use in predicting whether a user would like to visit a web site on the Internet based on various characteristics of the user. Predicting whether a user would like a particular web site is referred to as web site analysis. A belief network suitable for use in performing such web site analysis in accordance with an exemplary embodiment of the present invention is depicted in FIG. 5A. FIG. 5A shows a belief network 500 containing various nodes 502–508 and arcs connecting the nodes 510–518. The age node 502 represents the age of the user and has a number of states or values including: 0 for ages 0–18, 1 for ages 19–30, 2 for ages 31–40, and 3 for ages greater than 40. The sex node 504 contains a value indicating the sex, either male or female, of the user. The business node 506 contains a value (i.e., 0 for no and 1 for yes) indicating whether a particular user visited business-related web sites, and the travel node 508 contains a value (i.e., 0 for no and 1 for yes) indicating whether a particular user visited travel-related web sites. As can be seen from arcs 510–516, the values of both the age node 502 and the sex node 504 influence whether the user would like to visit business-related web sites as reflected by node 506 as well as whether the user would like to visit travel-related web sites as reflected by node 508. Additionally, the value of the business node 506 influences the value of travel node 508. An exemplary embodiment uses the belief network 500 to perform probabilistic inference where it receives observations for a number of the nodes and then determines whether the user would like to visit the business web site 506 or the travel web site 508 based on the received observations. One skilled in the art will appreciate that the belief network 500 is merely exemplary and that the belief network used by the exemplary embodiment may have many more nodes.

Figure 5B:
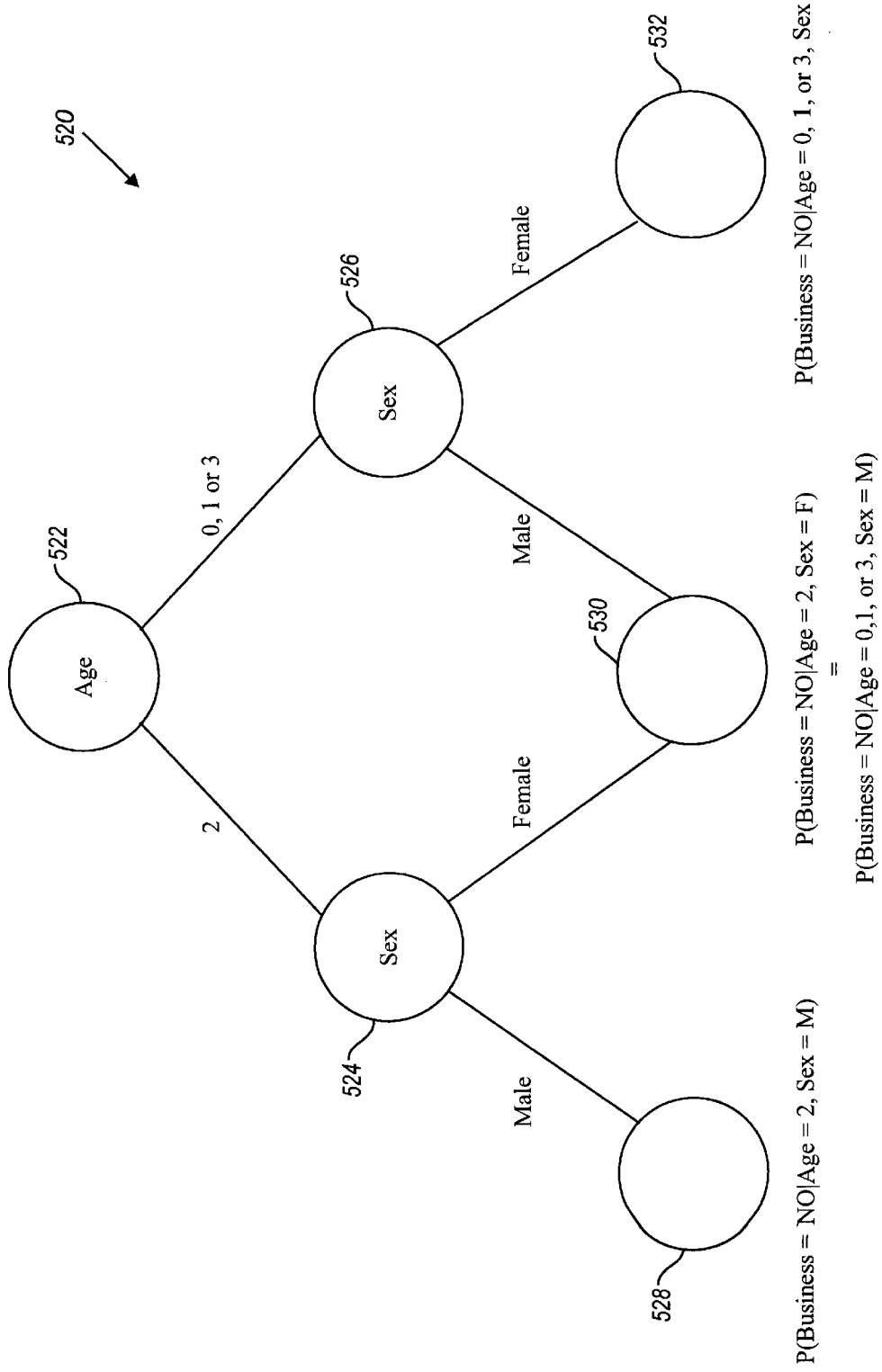
FIG. 5B depicts a decision graph suitable for use in one of the nodes of the belief network of FIG. 5A.

FIG. 5B depicts a decision graph 520 suitable for use in the business node 506 of the belief network 500 of FIG. 5A. In the decision graph 520, age vertex 522 serves as the root vertex of the data structure, sex vertices 524 and 526 serve as the intermediate vertices of the data structure, and vertices 528–532 serve as the leaf vertices of the data structure, which contain the probabilities for the business vertex 506 of the belief network 500. It should be noted that vertex 530 reflects an equivalence relationship where the probability of a female of age bracket 2 likely visiting business-related web sites and the probability of males of age brackets 0, 1, or 3 likely visiting business-related web sites are equivalent. The process of creating a decision graph for a node in the belief network of an exemplary embodiment is described in detail below.

Figure 5C:
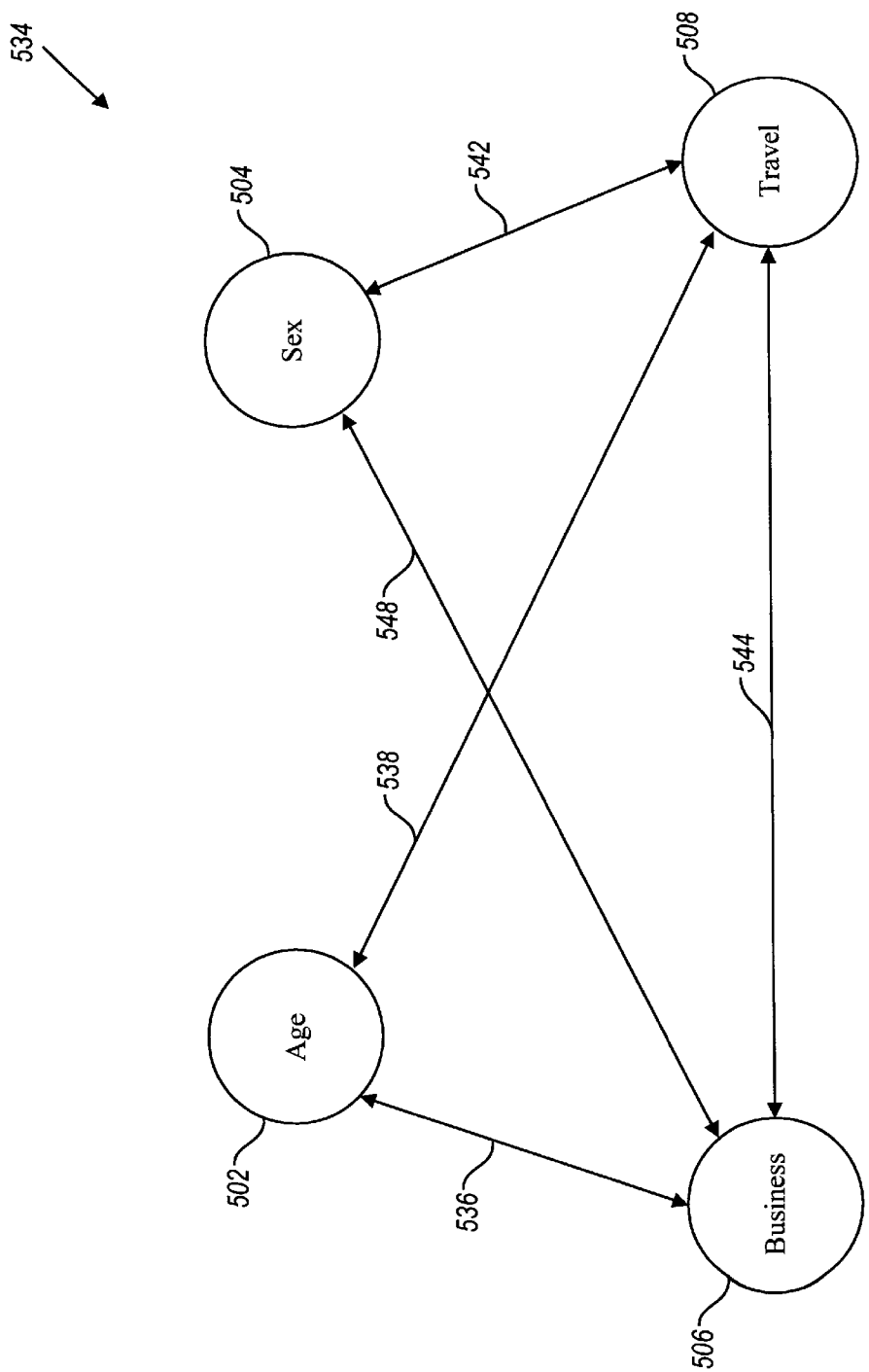
FIG. 5C depicts a belief network of an alternative embodiment of the present invention, which contains cycles.

An alternative embodiment of the present invention allows for the possible introduction of cycles into the belief network. The introduction of cycles into the belief network destroys the acyclic property of the belief network so that it is more appropriately referred to as a cyclic directed graph (or a cyclic belief network). FIG. 5C depicts a cyclic directed graph 534, which is similar to belief network 500, except that cycles have been introduced. Introducing cycles into a belief network is beneficial, because the resulting structure becomes more flexible so that it can more accurately reflect relationships in the data. That is, by permitting cyclic relationships into belief network, relationships, such as a dual dependency relationship, can be expressed. For example, with respect to the cyclic directed graph 534 of FIG. 5C, the business node 506 influences the value of the travel node 508, and the value of the travel node 508 influences the value of the business node 506. Such flexibility provides a more efficient belief network that more accurately reflects the data. Although all arcs 536–544 are shown as being bidirectional, one skilled in the art will appreciate that some arcs may be unidirectional.

Implementation Details

Figure 6:
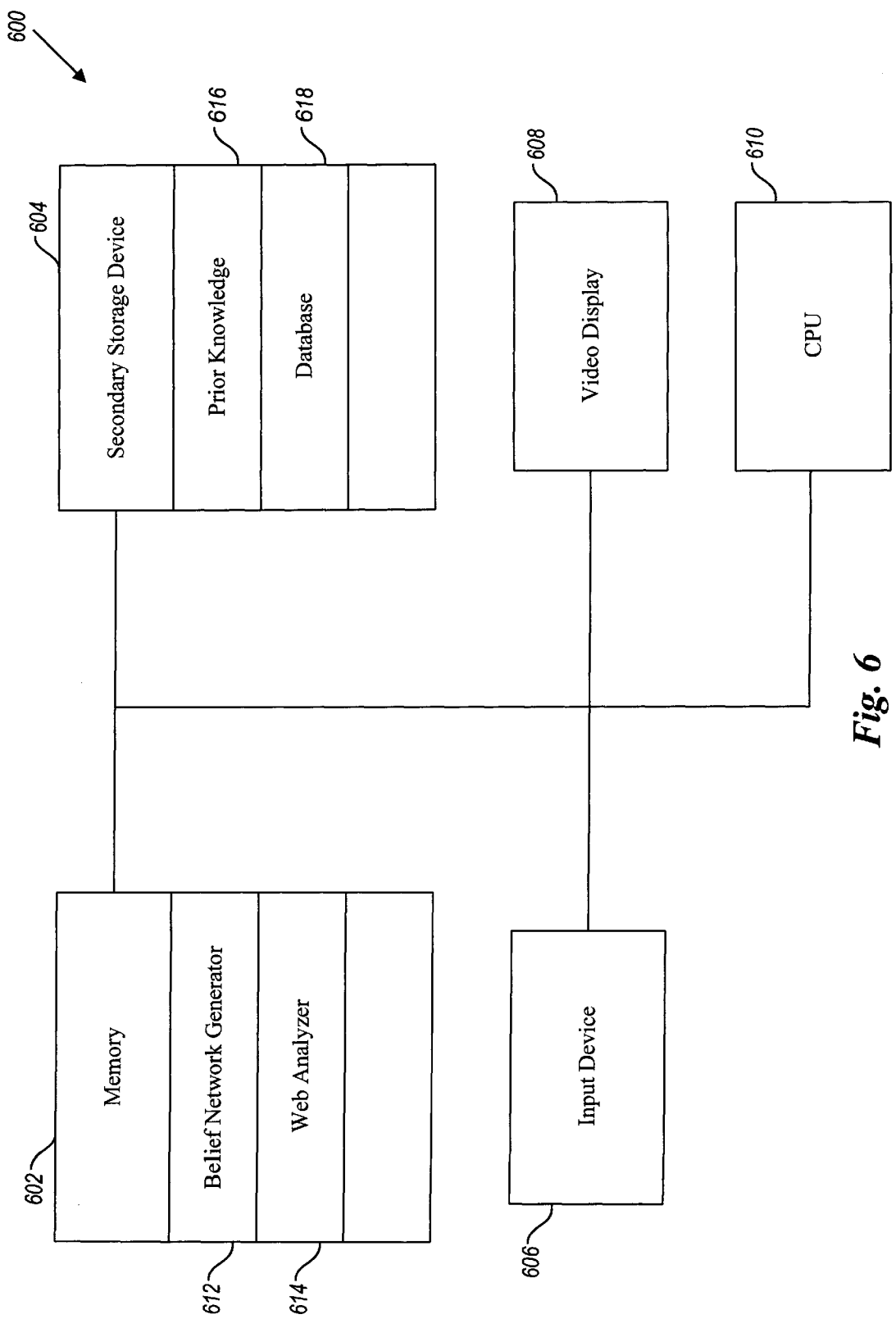
FIG. 6 depicts a computer system suitable for practicing an exemplary embodiment of the present invention.

FIG. 6 depicts a computer system that is suitable for practicing an exemplary embodiment of the present invention. The computer system 600 contains a memory 602, a secondary storage device 604, an input device 606, a video display 608, and a central processing unit (CPU) 610. The memory 602 contains a belief network generator 612 that is used for learning a belief network and a web analyzer 614 that utilizes the learned belief network to perform probabilistic inference and determines whether a given user would like to visit a particular category of web sites. The secondary storage device 604 contains prior knowledge 616 provided by the expert, which includes a prior belief network and an equivalent sample size. The secondary storage device also contains a database 618 that stores cases reflecting real-world instances of whether a number of users visited business-related or travel-related web sites.

FIG. 7 depicts the database 618 in greater detail. The database 618 contains a number of cases 702–706 that each identifies the characteristics of a user (i.e., age and sex) and whether they like to visit business-related web sites or travel-related web sites. Although only a few cases are depicted as being contained in database 618, one skilled in the art will appreciate that the database 618 may contain many more cases.

Figure 8A:
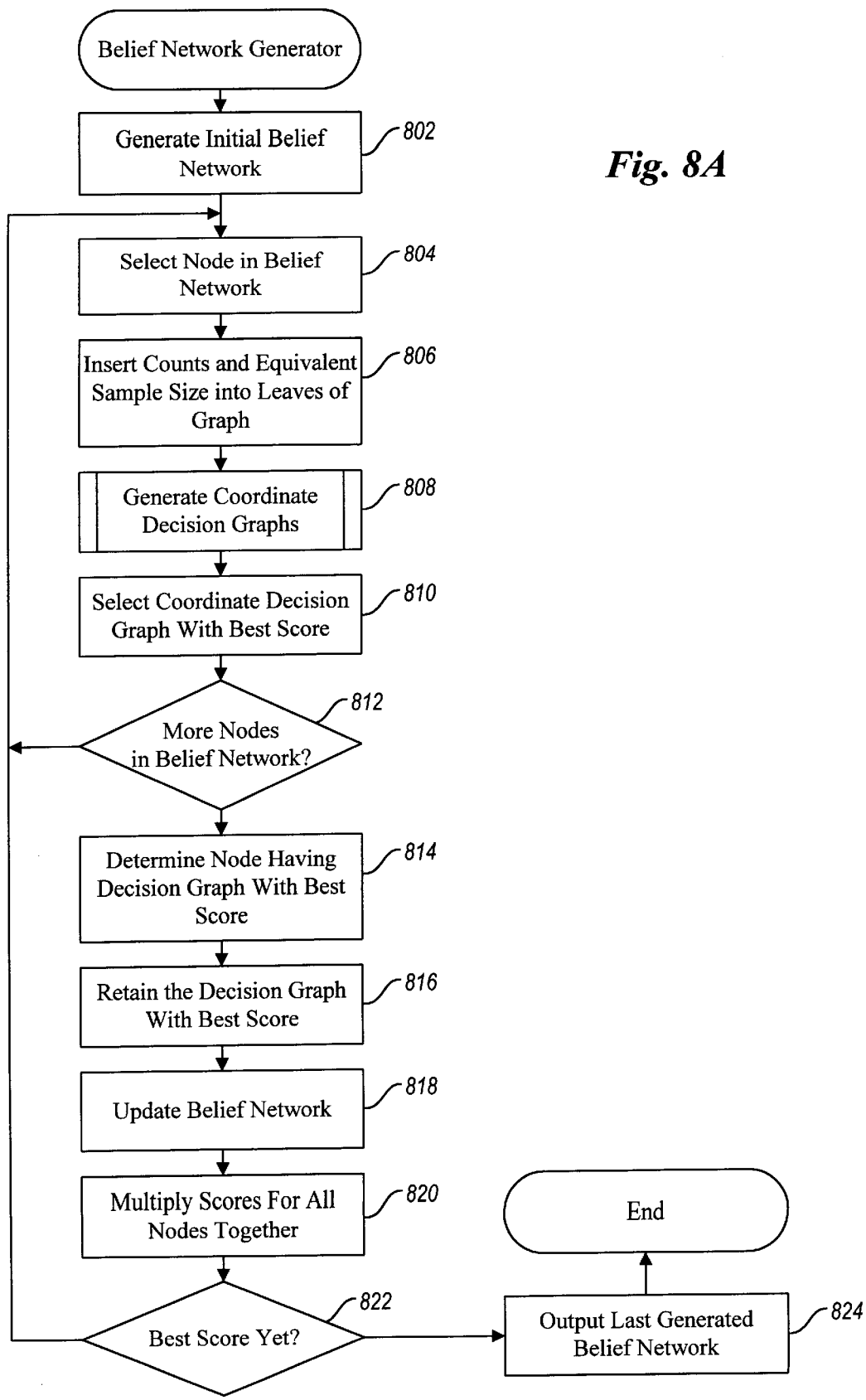
FIG. 8A depicts a flowchart of the steps performed by the belief network generator depicted in FIG. 6.
Figure 9A:
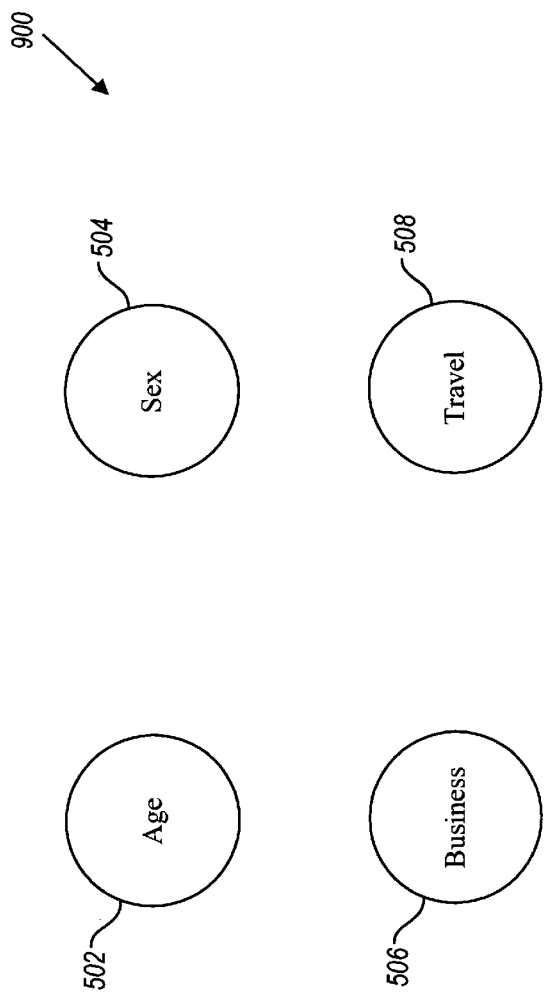
FIG. 9A depicts an initial belief network utilized by the belief network generator of FIG. 6.
Figure 9B:
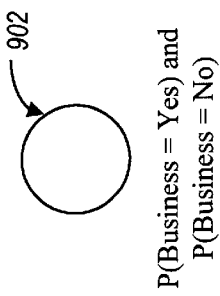
FIG. 9B depicts an initial decision graph for one of the nodes of the initial belief network of FIG. 9A.

FIG. 8A depicts a flowchart of the steps performed by the belief network generator of an exemplary embodiment. At the completion of the belief network generator's processing, a belief network similar to belief network 500 will be generated and the nodes of the belief network will have a decision graph similar to decision graph 520. The first step performed by the belief network generator is that the belief network generator creates an initial belief network from the prior knowledge 616 (step 802). As stated above, the prior knowledge 616 contains a prior belief network and the equivalent sample size. In this step, the belief network generator accesses the prior belief network, which contains nodes and which may contain arcs between the nodes. The belief network generator removes the arcs from the prior belief network to create an initial belief network 900, such as shown in FIG. 9A, which contains only the nodes of the belief network 502–508. These nodes 502–508 reflect the variables that the expert has identified as being relevant to the decision-making process. To create the initial belief network, the belief network generator inserts into each of the nodes 502–508 of the initial belief network an initial decision graph with a single leaf vertex. For example, FIG. 9B depicts an example initial decision graph 902 containing a single leaf vertex. In each node of the prior belief network, the expert has also provided the likelihood of all users either having the characteristic reflected by the node or likely visiting the category of web site reflected by the node. For example, the probability provided by the expert for the sex node may be 0.5 for the probability of sex=male. The belief network generator stores this probability into the leaf vertex of each initial decision graph. One skilled in the art will appreciate that the initial belief network 900 may contain arcs and the initial decision graph 912 may contain additional vertices and edges.

After creating the initial belief network, the belief network generator selects a node in the belief network (step 804 shown in FIG. 8A). After selecting a node in the belief network, the belief network generator inserts the counts and the equivalent sample size into the leaves of the decision graph of the node (step 806). The count for a leaf is the number of times each value of the leaf is observed in the database 618 for each value of its parent vertices. To better explain the counts stored in the leaf, consider decision graph 904 of FIG. 9C, which is an example decision graph for the business node 506. Leaf 908 of decision graph 904 contains two counts: one count indicates the number of times in the database where sex=male and business=yes, and the other count indicates the number of times that sex=male and business=no. Leaf 912 also contains two counts: one count for the number of times in the database where sex=female, age=2, and business=yes, and the other count is for the number of times sex=female, age=2, and business=no. Similarly, leaf 914 contains two counts: one count for the number of times sex=female, age=0, 1, or 3, and business=yes, and the other count is for sex=female, age=0, 1, or 3, and business=no. It should be appreciated that if a leaf could be arrived at through more than one path, such as occurs when an equivalency relationship is reflected by the decision graph, the leaf will have additional counts. In addition to storing the counts, the belief network generator stores in each leaf the equivalent sample size, which is the equivalent number of times that the expert has seen this outcome for the values of the parents of this leaf. For example, with respect to the decision graph 904 of FIG. 9C, the equivalent sample size that the administrator inserts into leaf 908 is the equivalent number of times that the expert has observed male users liking business-related web sites and the number of times that the expert has observed male users disliking business-related web sites. One skilled in the art will appreciate that the equivalent sample size for a leaf can be produced by accessing the prior belief network with the equivalent sample size. Each leaf vertex has an equivalent sample for each state of the node of the belief network.

These equivalent sample sizes are calculated using the prior belief network as follows:

$$\alpha \sum_{j \in J} p(x_i = state,\ Pa(x_i) = j | B^p)$$

where $\alpha$ is the equivalent sample size in the prior knowledge 616, "J" is the set of all parent states leading to the leaf vertex, "$x_i$" is the node of the belief network, "state" is a given state of node $x_i$, "$Pa(x_i)$" are the parents of $x_i$, and $B^P$ is the prior belief network. Next, the belief network generator makes various adjustments to the decision graph and generates a number of candidate decision graphs (step 808). This step is further discussed below with respect to FIG. 8B.

After generating the candidate decision graphs, the belief network generator selects the candidate decision graph with the best score (step 810 shown in FIG. 8A). In this step, the belief network generator generates a score for each decision graph generated in step 808. This score indicates the goodness of the graph at reflecting the data contained in the database. This step is performed by performing the following calculation:

$$\prod_{a=1}^{n} \prod_{b \in G_a} \frac{\Gamma(\alpha_{ab})}{\Gamma(N_{ab} + \alpha_{ab})} \prod_{c=1}^{r_a} \frac{\Gamma(N_{abc} + \alpha_{abc})}{\Gamma(\alpha_{abc})}$$

Where "n" is the total number of nodes in the belief network, where $G_a$ is the set of leaves for the decision graph in node "a" of the belief network, and where $r_a$ is the number of states of node "a." The term "$\alpha_{abc}$" is the equivalent sample size, which is the equivalent number of times that an expert has observed a value for a particular node "a" and the parents of leaf "b" in the decision graph of node "a" are in a state that leads to leaf "b." The term "$\alpha_{ab}$" is the sum over "c" of "$\alpha_{abc}$". The term "$N_{abc}$" is the number of cases where node "a" has a value "c" and the parents of leaf "b" in the decision graph of node "a" are in a state that leads to leaf "b." The term "$N_{ab}$" is the sum over "c" of "$N_{abc}$." When performing this step, most of the leaves of the decision graph will have the counts already stored from the processing performed in step 806. However, for those newly generated leaves, created during the processing of step 808 (discussed below), the counts have not been stored. For these leaves, the belief network generator obtains the counts as described above. The "$\Gamma_o$" is the Gamma function defined as follows:

$$\Gamma(x) = \int_0^\infty e^{-y} y^x dy$$

After scoring each candidate graph, the belief network generator selects the candidate graph with the best score and stores this graph into the node.

Most candidate graphs (other than the first one generated) reflect a single change to a preexisting candidate decision graph where one or more vertices are added. Therefore, when a preexisting decision graph has already been scored, the exemplary embodiment can optimize the scoring step. The exemplary embodiment optimizes the scoring step by obtaining a partial score by only scoring the added vertices, by multiplying this partial score by the score of the preexisting decision graph, and by dividing out the portion of the score for parts of the preexisting decision graph that no longer exist (i.e., any vertices or edges that were removed).

Next, the belief network generator determines if there are more nodes in the belief network for processing (step 812).

If there are more nodes in the belief network for processing, processing continues to step 804. However, if there are no more nodes in the belief network for processing, the belief network generator identifies which node has the graph with the best score (step 814). In this step, the belief network generator compares the score of the graph selected in step 810 for each node to determine which of the nodes ("the selected node") has the graph whose relative score has improved the most ("the selected decision graph"). The belief network generator then makes the change reflected by the selected decision graph by retaining the selected decision graph (step 816). In this step, the selected decision graph replaces the current decision graph in the selected node.

After replacing the graph, the belief network generator updates the belief network (step 818). In this step, the belief network generator determines if the change made per the selected decision graph reflects that a relationship between the nodes of the belief network exists, which is not currently reflected by the belief network. To do this, the belief network generator determines if the change reflected by the selected decision graph was either a complete split or a binary split on a node that is not currently a parent of the selected node as reflected in the belief network. Both a complete split and a binary split are discussed below. This test is performed to determine whether the belief network structure needs to be updated. In this situation, a node was added into the selected decision graph for the selected node in the belief network, which indicates that the added node influences the probabilities for the selected node. Since the probabilities of the selected node are influenced by a node that is not currently a parent to the selected node in the belief network, an arc is added from the node to the selected node in the belief network to indicate such a relationship. This addition of an arc may introduce a cycle in the alternative embodiment, but in the exemplary embodiment, since there are restrictions placed on the conditions under which a split occurs, no cycle is introduced.

After updating the belief network, the belief network generator multiplies the scores for all nodes (i.e., the decision graphs in the nodes) together (step 820). The belief network generator then compares this score for the belief network against the most recent belief network generated by the belief network generator to determine if this is the best score yet (step 822). The belief network generator retains the last belief network that is produced. If the score for the most recent belief network is the best score yet, processing continues to step 804 to generate another belief network. However, if the score is not the best yet, then the belief network generator outputs the last generated belief network, which is the belief network with the highest score (step 824).

Figure 8B:
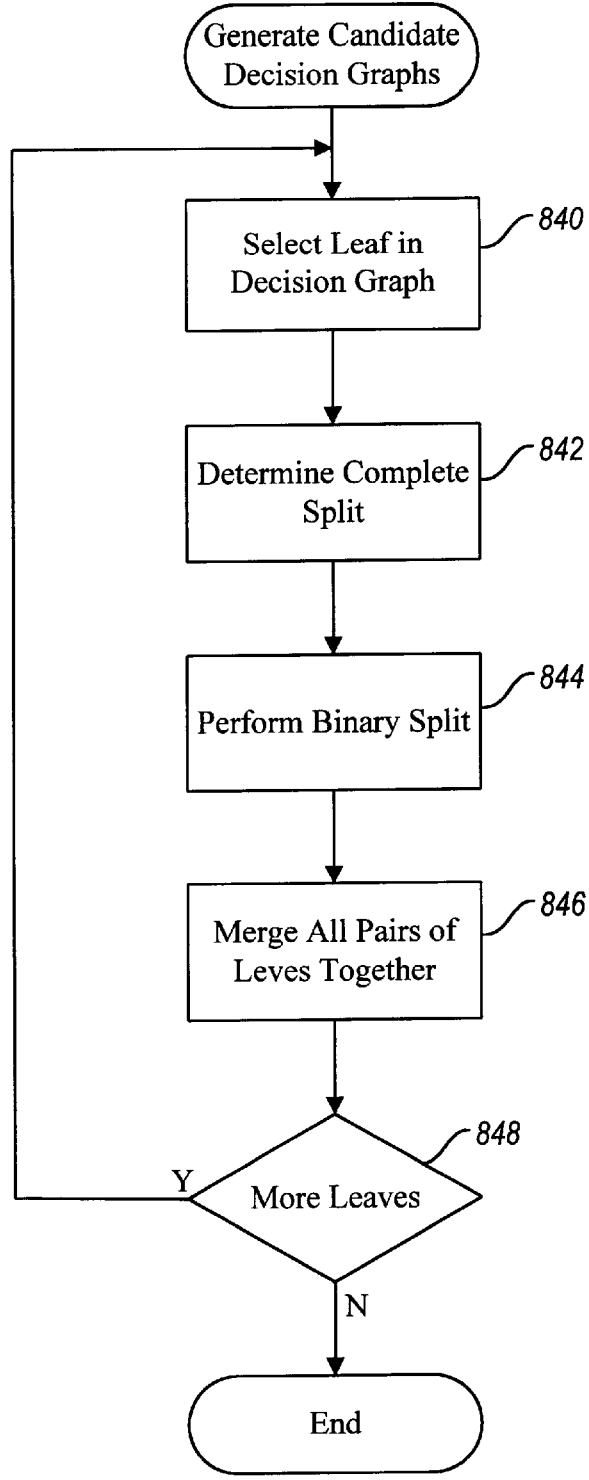
FIG. 8B depicts a flowchart of the steps performed by the belief network generator when generating candidate decision graphs.
Figure 9C:
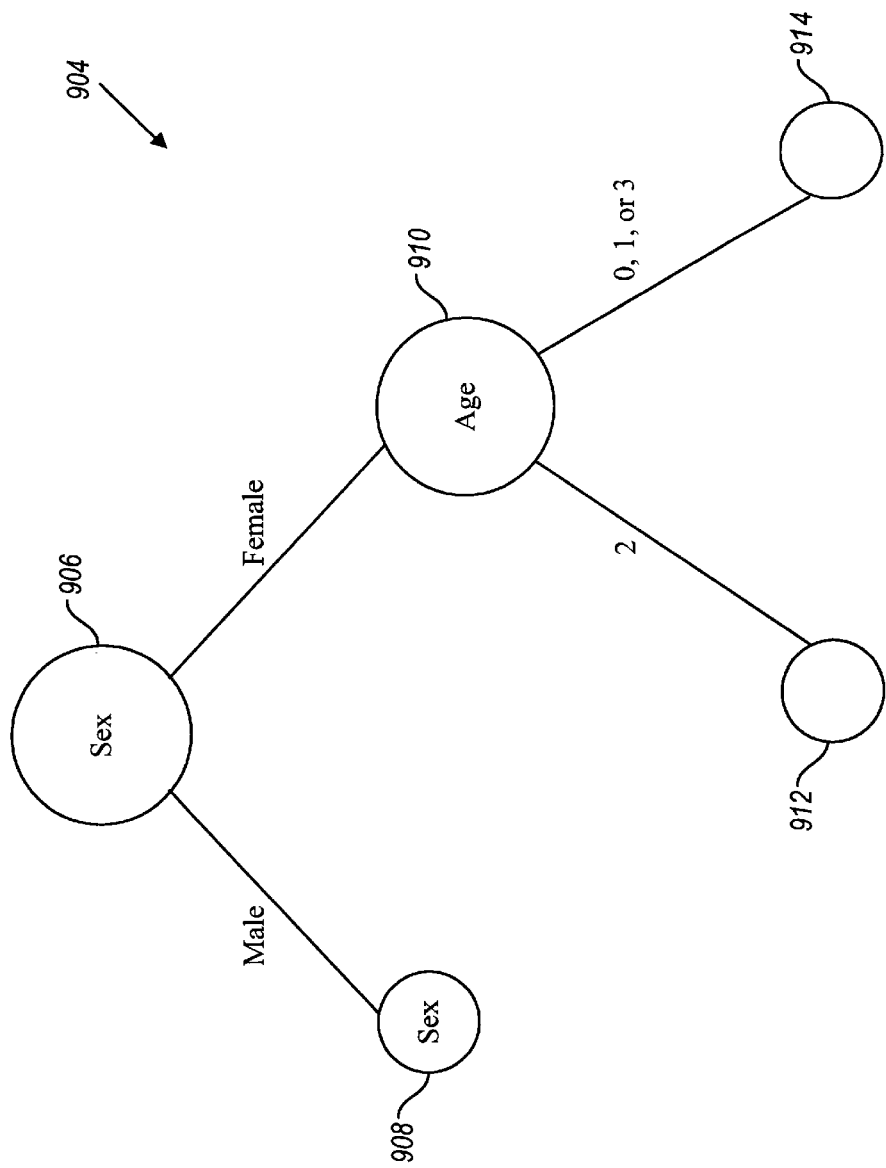
FIG. 9C depicts an example decision graph.
Figure 9D:
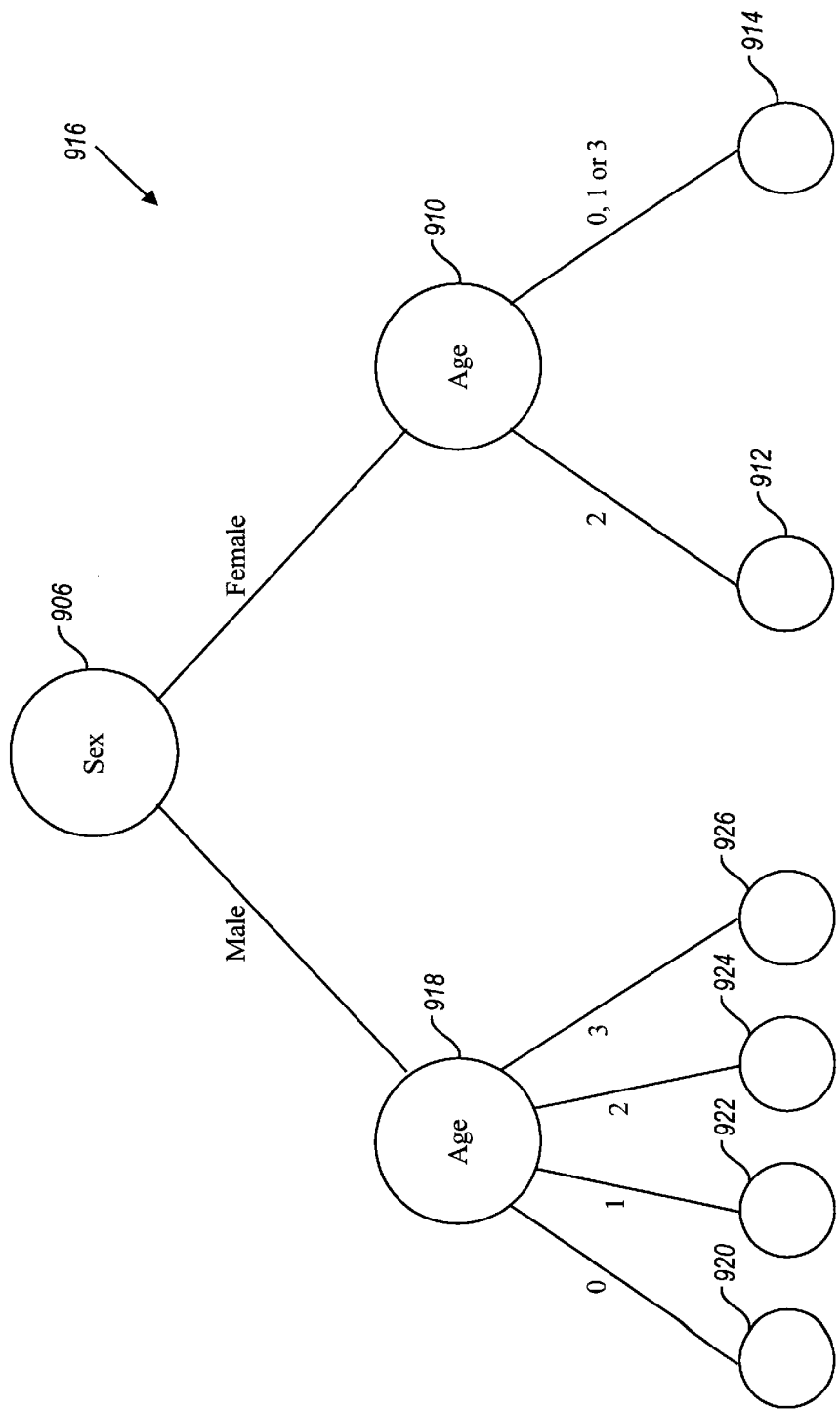
FIG. 9D depicts the example decision graph of FIG. 9C after a complete split has been performed on one of the leaf nodes.

FIG. 8B depicts a flowchart of the steps performed by the belief network generator in step 808 of FIG. 8A to generate candidate decision graphs. The processing of this flowchart is performed on the decision graph of a node ("the identified node") of the belief network identified per step 804 of FIG. 8A. The first step performed by the belief network generator is to select a leaf in the decision graph of the identified node (step 840). After selecting a leaf, the belief network generator performs a complete split to generate a number of new decision graphs (step 842). In this step, the belief network generator performs a complete split on all nodes of the belief network that are not descendants of the identified node ("non-descendent nodes"). For example, with respect to the belief network 500 of FIG. 5A, if the identified node is the business node 506, the non-descendant nodes include the age node 502 and the sex node 504, but not the travel node 508, because the travel node is a descendent of the business node. This limitation is enforced so as to prevent the introduction of cycles into the belief network. However, if an alternative embodiment of the present invention is used where cycles are allowed to be introduced into the belief network, then complete splits are performed on all nodes in the belief network other than the parent of the leaf node. When performing a complete split, the belief network generator selects one of the non-descendent nodes described above and replaces the leaf node in the decision graph with a vertex that corresponds to the selected non-descendent node. Then, new leaves are created which depend from the newly created vertex; one leaf vertex is created for each value of the newly added vertex. For example, if the leaf vertex 908 of the decision graph 904 of FIG. 9C had a complete split performed on the age node, the resulting decision graph appears in FIG. 9D where the leaf 908 of FIG. 9C is replaced with age vertex 918 of FIG. 9D and leaves 920–926 are created, one for each value of the age vertex (i.e., each state of the age node of the belief network). Each complete split on a particular non-descendent node generates a new decision graph which is stored. To conserve space, an exemplary embodiment stores an identification of the change and not the entire decision graph.

Figure 9E:
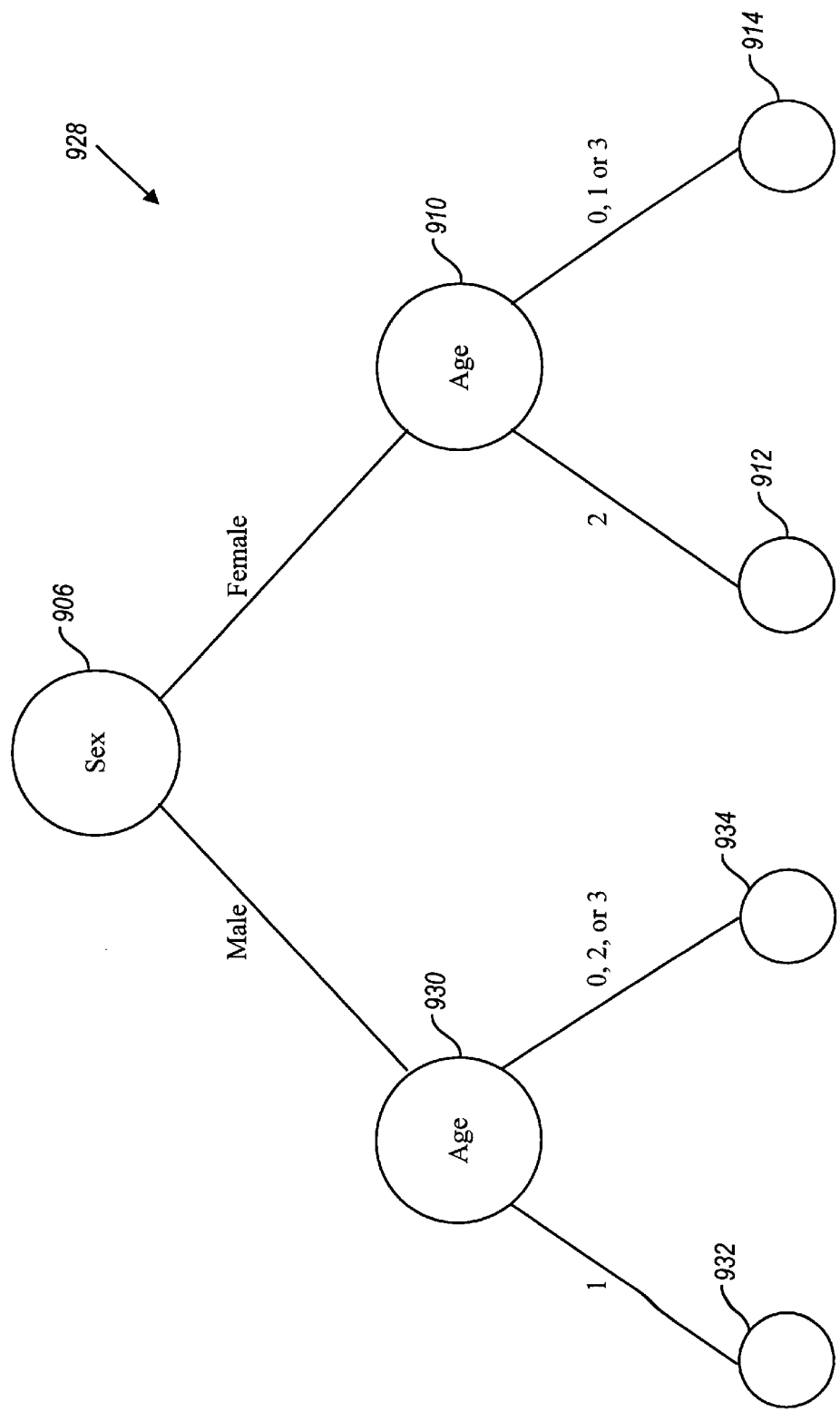
FIG. 9E depicts the example decision graph of FIG. 9C after a binary split has been performed on one of the leaf nodes.

After performing a complete split, the belief network generator performs a binary split if the number of states is greater than two (step 844 shown in FIG. 8B). In this step, a binary split is performed on the leaf for all nodes that are not descendants of the identified node as reflected in the belief network and for all values for these non-descendent nodes. As stated above, this restriction is enforced to prevent the addition of cycles into the belief network. However, an alternative embodiment does not enforce this restriction. In a binary split operation, a leaf is replaced with a vertex that corresponds to one of the non-descendant nodes, and two leaves are generated from the newly created vertex node: one of the leaves contains a single value and the other leaf contains all other values. For example, in the decision graph 904 of FIG. 9C, if leaf 908 had a binary split performed on the age variable, the leaf 908 of FIG. 9C would be replaced with age vertex 930 as shown in FIG. 9E and two leaves 932 and 934 would be generated for that vertex. The first leaf 932 would contain one value (e.g., 1) and the second leaf 934 would be for all other values of the age vertex 930 (e.g., 0, 2 and 3). As stated above, the binary splits on the leaf will be performed for all non-descendent nodes and for each value of each non-descendent node. Thus, when a node has n values, a binary split is performed on this node n times. For example, since the age node has four values, four splits would occur: (1) one leaf would have a value of 0, and the other leaf would have a value of 1, 2, or 3; (2) one leaf would have a value of 1, and the other leaf would have a value of 0, 2, or 3; (3) one leaf would have a value of 2, and the other leaf would have a value of 0, 1, or 3; (4) one leaf would have a value of 3, and the other leaf would have a value of 0, 1, or 2. The belief network generator stores identifications of the changes reflected by these binary splits.

Figure 9F:
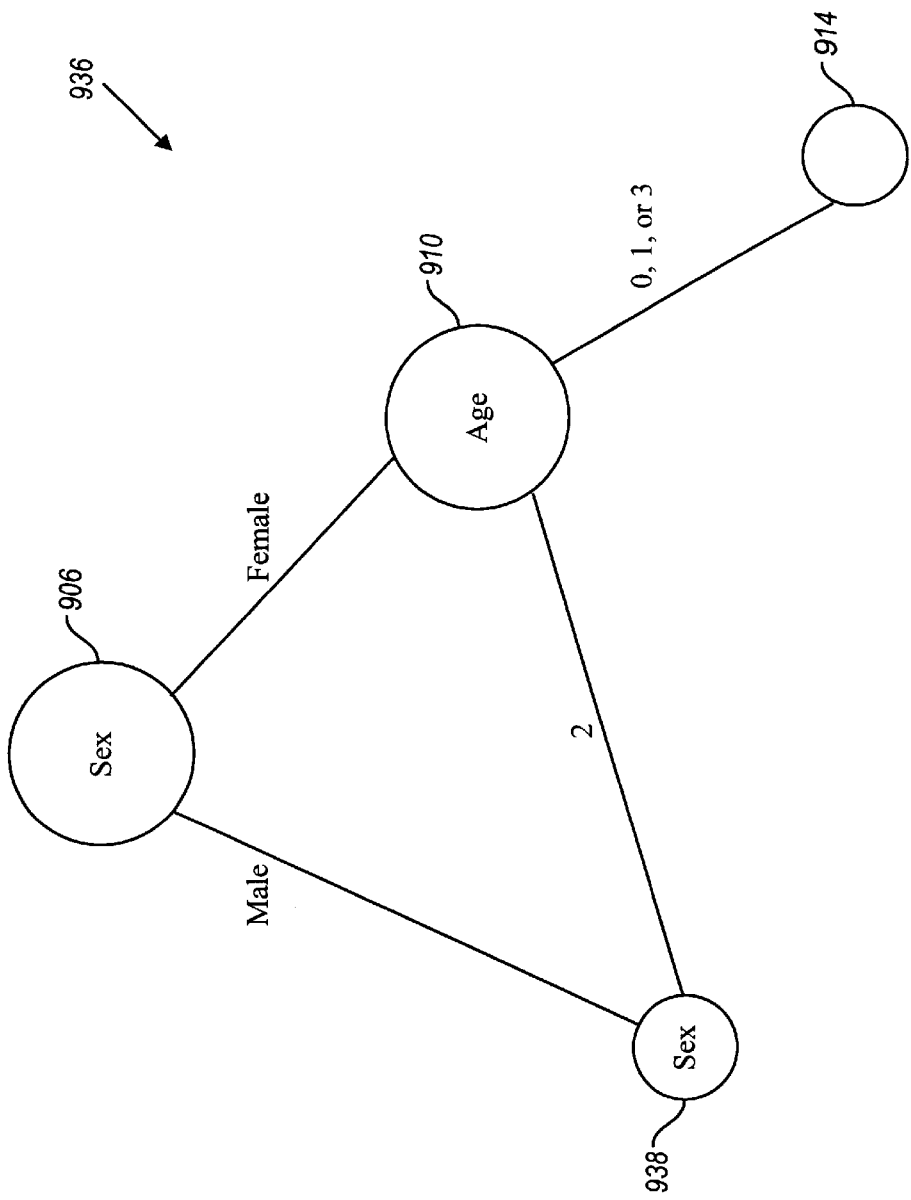
FIG. 9F depicts the example decision graph of FIG. 9C after a merge has been performed on two of the leaf nodes of the decision graph of FIG. 9C.

After performing a binary split, the belief network generator merges all pairs of leaf nodes together (step 846 shown in FIG. 8B). In this step, the belief network generator generates a number of new decision graphs by merging the leaf node selected in step 840 with each other leaf node to form a single vertex. For example, with respect to the decision graph 904 of FIG. 9C, leaf 908 and leaf 912 can be merged into a single leaf 938 as depicted in FIG. 9F. After merging all pairs of leaf nodes, the belief network generator determines if the decision graph has more leaves for processing. If so, processing continues to step 840. Otherwise, processing ends. Although the exemplary embodiment is described as performing a complete split, a binary split, and a merge, one skilled in the art will appreciate that other operations can be performed.

Figure 10:
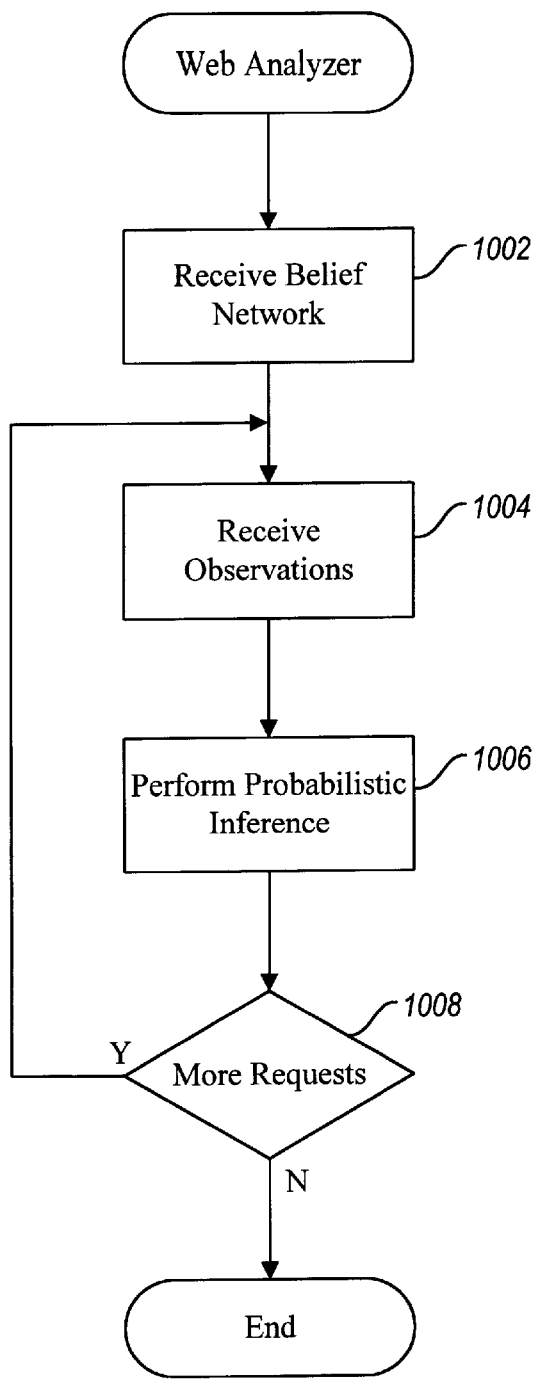
FIG. 10 depicts a flowchart of the steps performed by the web analyzer of an exemplary embodiment of the present invention.

FIG. 10 depicts a flowchart of the steps performed by the web analyzer of an exemplary embodiment of the present invention. The web analyzer first receives the belief network output by the belief network generator (step 1002). After receiving the belief network, the web analyzer receives a request from a user containing values (step 1004). In this step, the belief network generator receives observations or values for a number of the nodes of the belief network. For example, the user may input their age and sex. The web analyzer then performs probabilistic inference and ranks the web site categories, business and travel, by the likelihood that the user would like to visit them (step 1006). In this step, any standard belief network inference algorithm, such as the one described in Jensen, Lauritzen, and Olesen, *Bayesian Updating in Recursive Graphical Models by Local Computations,* Technical Report R-89-15, Institute of Electronic Systems, Aalborg University, Denmark, may be used by an exemplary embodiment of the present invention. Before using such an inference algorithm, the probabilities of each belief network node is expressed as a table. Such an inference algorithm and its usage is described in greater detail in the '238 application. If the belief network of an alternative embodiment is used, where the belief network contains cycles, the inference algorithm used is to merely access the decision graph with the values for the nodes received in step 1004 to determine the probability. In this situation, all parent nodes of a node for which inference is requested should have a value provided. After performing probabilistic inference and ranking the nodes reflecting categories of web sites, the web analyzer determines if there are more requests from the user (step 1008). If there are more requests, processing continues to step 1004. However, if there are no more requests, processing ends.

While the present invention has been described with reference to a preferred embodiment thereof, those skilled in the art will know of various changes in form that may be made without departing from the spirit and scope of the claimed invention as defined in the appended claims.

What is claimed is:

1. A method for forming an enhanced version of a belief network for subsequent use in assisting a user, through computer-aided probabilistic inferences, in a decision-making process, the method being implemented in a computer system having a processor and a storage device connected to the processor, wherein the storage device stores computer executable instructions and a data structure, the data structure storing the enhanced version of the belief network, the method comprising the steps, implemented by the processor through execution of the instructions, of:

receiving an initial version of the belief network, the belief network probabilistically relating a plurality of different input variables to a plurality of different output decisions, the initial version of the belief network having network nodes each with a probability and each having a decision graph data structure with a graph node used for storing the probability;

for each network node in the initial belief network:
  accessing a database containing cases of real-world instances of the decision-making process, each case containing a value for the graph node of the decision graph;
  counting a number of values for the graph node contained in the cases;

for each graph node that is a leaf graph node in the graph data structure,
  performing a complete split on the leaf graph node to generate a plurality of complete split decision graphs;
  performing a binary split on the leaf graph node to generate a plurality of binary split decision graphs; and
  performing a merge on the leaf graph node to generate a plurality of merge decision graphs;

scoring each of the complete split decision graphs, the binary split decision graphs, and the merge decision graphs for goodness at reflecting the cases using the counted number of values;

determining which among the complete split decision graphs, the binary split decision graphs, and the merge decision graphs is a graph with a greatest score and retaining the graph with the greatest score so as to define a retained graph;

determining which network node is a best network node having the retained graph with a best score among the retained graphs;

storing the retained graph of the best network node into the best network node for use in accessing the probability of the best network node; and adjusting the initial version of the belief network responsive to storing the retained graph to create the enhanced version of the belief network for storage in the data structure in the storage device for subsequent use in assisting the user, through the computer-aided probabilistic inferences, with the decision-making process.

2. The method of claim 1 wherein the graph nodes in the best network node correspond to a plurality of the network nodes in the initial belief network and the method further comprises the steps of:

determining whether the retained graph for the best network node was generated such that a graph node was added to the retained graph in the best network node where the network node that corresponds to the added graph node is not a parent to the best network node in the belief network; and when it is determined that the retained graph was generated such that the graph node was added to the retained graph in the best network node where the network node that corresponds to the added graph node is not a parent to the best network node in the belief network,
adding an arc in the belief network from the network node that corresponds to the added graph node to the best network node.

3. The method of claim 1 wherein the utilizing step includes performing web analysis.

4. The method of claim 1 wherein the adjusting step includes adding an arc such that a cycle is introduced into the enhanced version of the belief network.

5. A method for performing probabilistic inference in a computer system, the computer system having a processor and a storage device connected to the processor, wherein the storage device stores computer executable instructions and a data structure, the data structure storing a belief network, the belief network probabilistically relating a plurality of different input variables to a plurality of different output decisions, wherein the belief network comprises nodes and arcs indicating relationships between the nodes, a first of the nodes having a decision graph with leaf vertices containing probabilities, one of the leaf vertices being an equivalence vertex such that the decision graph has a plurality of paths to the equivalence vertex, comprising the steps, implemented by the processor through execution of the instructions, of:

receiving an observation for a second of the nodes of the belief network; and accessing the decision graph of the first of the nodes to perform probabilistic inference, for a given one of the input variables, using the probability in the equivalence vertex of the decision graph in the first node and the observation so as to select one of the output decisions; and providing the selected one decision as an output of the system.

6. The method of claim 5 wherein the receiving step includes receiving a characteristic of a user and wherein the accessing step accesses the decision graph of the first node to determine whether the user would likely like to visit a category of web sites based on the characteristic.

7. A computer-readable medium having computer executable instructions stored therein, said instructions being executed by a computer, for performing the steps of claim 6.

8. In a computer system having a processor and a storage device connected to the processor, wherein the storage device stores computer executable instructions and a data structure, the data structure storing a belief network, wherein the belief network probabilistically relates a plurality of different input variables to a plurality of different output decisions, a method for use in the system for scoring the belief network, wherein the belief network has nodes and arcs indicating relationships between the nodes, a plurality of the nodes having decision graphs containing probabilities for rendering inferences when given an observation for another node, and the belief network provides probabilistic based decision-support to a user of the system in a field of decision making, comprising the steps, implemented through the computer executable instructions, of:

accessing a database having observations for the nodes of the belief network representing instances of real-world decisions relevant to a predetermined field of decision making;

scoring the decision graph in each node for goodness at reflecting the observations in the accessed database, wherein the decision graph reflects relationships among the nodes of the belief network, one of the reflected relationships being an equivalency relationship where a plurality of paths through the decision graph refer to a common probability, and wherein the scoring is performed to determine whether the observations indicate that the decision graph should reflect additional relationships; and combining the scores of the decision graphs to generate a score for the belief network, wherein the score reflects how accurately the belief network represents a decision making process between the input variables and the output decisions.

9. The method of claim 8 wherein the scoring step includes scoring the decision graphs based on expert data received from an expert in the field of the decision making.

10. The method of claim 8, further including the step of adjusting at least one of the decision graphs to improve the score of the at least one decision graph.

11. The method of claim 10, further including the step of adjusting the belief network when the at least one decision graph indicates that a relationship between the nodes of the belief network exists that is not reflected by the belief network.

12. The method of claim 11 wherein the step of adjusting the belief network includes adding an arc that introduces a cycle into the belief network to create a cyclic directed graph.

13. The method of claim 12, further including the step of performing probabilistic inference using the cyclic directed graph.

14. The method of claim 8 wherein the decision graph has vertices with a plurality of states, wherein a plurality of the vertices correspond to the nodes of the belief network, wherein a plurality of the vertices are leaf vertices, wherein the database contains observations for the states of the vertices, and wherein the scoring step includes the steps of:

for each node of the belief network,
    for each leaf vertex of the decision graph for the node of the belief network,
        dividing a first equivalent sample size for the vertex and the leaf vertex by a sum of a count of a number of times that the vertex and the leaf vertex are contained in the observations; and
    for each state of the leaf vertex,
        dividing a sum of a count of a number of times that the state of the leaf vertex of the decision graph of the node of the belief network appears in the observations and a second equivalent sample size for the state of the leaf vertex of the decision graph of the node of the belief network by the second equivalent sample size.

15. A computer-readable medium having executable instructions stored therein, said instructions being executed by a computer, for performing the steps of claim 8.

16. In a computer system having a processor and a storage device connected to the processor, wherein the storage device stores computer executable instructions and a data structure, the data structure storing a belief network, the belief network probabilistically relating a plurality of different input variables to a plurality of different output decisions, a method for use in the system for improving accuracy of the belief network, belief network having nodes and arcs indicating relationships between the nodes, each node having a decision graph containing probabilities for rendering inferences, comprising the steps, implemented by the processor through execution of the instructions, of:

scoring one of the decision graphs in one of the nodes of the belief network to determine goodness at rendering inferences; and adjusting the scored decision graph to improve the score of the scored decision graph and to improve the accuracy of the belief network such that the adjustment creates a plurality of paths in the scored decision graph that refer to a common probability such that given one of the input variables, as an observation, probabilistic inference undertaken by the system and based on the stored belief network, will yield through enhanced accuracy, one of the output decisions.

17. The method of claim 16 wherein the nodes of the belief network have states, wherein the decision graph has a plurality of leaf nodes, wherein the adjusting step includes replacing one of the leaf nodes of the decision graph with a corresponding node that corresponds to one of the nodes of the belief network and creating a leaf node connected to the corresponding node for each of the states of the node of the belief network that corresponds to the corresponding node.

18. The method of claim 16 wherein the nodes of the belief network have states, wherein the decision graph has a plurality of leaf nodes, wherein the adjusting step includes replacing one of the leaf nodes of the decision graph with a corresponding node that corresponds to one of the nodes of the belief network and creating two leaf nodes that are each connected to the corresponding node, a first of the created leaf nodes representing one of the states of the node of the belief network that corresponds to the corresponding node and a second of the created leaf nodes representing remaining states of the node of the belief network that corresponds to the corresponding node.

19. The method of claim 16 wherein the decision graph contains a plurality of leaf nodes, and wherein the adjusting step includes merging two of the leaf nodes together to form a single leaf node.

20. The method of claim 16 wherein the decision graph has nodes corresponding to a plurality of the nodes of the belief network, the method further including the step of when the decision graph adjustment adds a node to the decision graph whose corresponding node in the belief network is not a parent to the at least one of the nodes in the belief network, updating the belief network to indicate that a value of the corresponding node causally influences the at least one of the nodes in the belief network.

21. The method of claim 20 wherein the update to the belief network introduces a cycle.

22. The method of claim 16 wherein the adjusting step includes adjusting the decision graph to generate a plurality of candidate decision graphs, scoring the generated decision graphs, determining which among the generated decision graphs has a best score, and selecting the decision graph having the best score for use in the one node of the belief network.

23. A computer-readable medium having computer executable instructions stored therein, said instructions being executed by a computer, for performing the steps of claim 16.

24. A computer-readable media containing a data structure for use, by a computer, in performing computer-implemented probabilistic inferences, to support decision-making by a user, the data structure storing a belief network that comprises nodes and arcs connecting the nodes, the nodes containing:
a decision graph with leaf nodes containing probabilities, wherein the decision graph has a path to each leaf node, wherein one of the leaf nodes more than one path to the one leaf node, the decision graph used for accessing the probabilities within the leaf nodes to perform probabilistic inference.

25. A computer system for making probabilistic inferences based on a belief network so as to assist a user in making a decision in a decision-making field, comprising:
a processor; and
a storage device, connected to the processor and storing computer executable instructions and a data structure, the data structure storing a belief network, the belief network probabilistically relating plurality of different input variables to a plurality of different output decisions;
wherein the storage device further stores:
expert knowledge comprising an initial belief network with nodes and a decision graph in each node containing probabilities, each decision graph having nodes corresponding to a plurality of the nodes of the belief network; and
a database containing cases of real-world instances of decisions made in the decision-making field;
wherein the processor, in response to execution of the instructions:
generates the stored belief network by receiving an initial version of the belief network, scoring each decision graph in the initial version of the belief network based on the cases in the database, adjusting at least one of the decision graphs to improve the score for the at least one of the decision graphs, and adjusting the initial version of the belief network so as to form an enhanced version of the belief network that reflects the adjustment to the at least one of the decision graphs when the adjustment indicates that a relationship in the enhanced version of the belief network exists that the initial belief network does not reflect, and for storing the enhanced version of the belief network as the stored belief network; and
receives an observation for at least one of the input variables in the belief network, and performs, using the stored belief network, probabilistic inference responsive to the observation so as to specify one of the output decisions to the user for assisting the user in making the decision.

26. The computer system of claim 25 wherein the processor, in response to the executable instructions, receives characteristics of the user and determines whether the user would likely visit a web site.

27. The computer system of claim 25 wherein the at least one of the decision graphs has a leaf node and wherein the processor, in response to the stored instructions, adjusts the at least one of the decision graphs by performing a complete split on the leaf node.

28. The computer system of claim 25 wherein the at least one of the decision graphs has a leaf node and wherein the processor, in response to the stored instructions, adjusts the at least one of the decision graphs by performing a binary split on the leaf node.

29. The computer system of claim 25 wherein the at least one of the decision graphs has a plurality of leaf nodes and wherein the processor, in response to the stored instructions, adjusts the at least one of the decision graphs by merging two of the leaf nodes.

30. The computer system of claim 25 wherein the processor, in response to the stored instructions, adjusts the initial version of the belief network such that a cycle is introduced into the enhanced version of the belief network.

31. In a computer having a processor and a storage device connected to the processor, wherein the storage device stores computer executable instructions and a data structure, the data structure storing a belief network, wherein the belief network probabilistically relates a plurality of different input variables to a plurality of different output decisions, a method for use in the system for assisting a user in making a decision, comprising the steps, implemented by the processor through execution of the instructions, of:
receiving the belief network having a graph data structure with nodes and arcs indicating relationships between the nodes, a plurality of the nodes and at least one of the arcs forming a cycle, each node having a probability;
receiving an observation for a first of the nodes; and
performing probabilistic inference with the received observation, using the stored belief network, by accessing the probability in a second of the nodes, the second of the nodes being part of the cycle in the graph data structure so as to select one of the output decisions and provide the one output decision as output to the user.

32. The method of claim 31 wherein the step of receiving an observation includes receiving a characteristic of a user, and wherein the step of performing probabilistic inference includes determining whether the user would likely visit a category of web sites.

33. The method of claim 31 wherein the nodes of the graph data structure have a plurality of states, wherein a plurality of the nodes are parent nodes and each parent node has an arc to a child node to indicate that the parent node influences the state of the child node, wherein the step of receiving an observation includes receiving an observation for the state of all of the parent nodes to perform probabilistic inference for one of the child nodes.

34. The method of claim 33 wherein the one child node has a probability for each combination of states of the parent nodes of the one child node, wherein the received observations reflect a combination of states of the parent nodes of the one child node, and wherein the step of performing probabilistic inference includes selecting the probability for the states of the parent nodes of the one child node reflected by the received observations.

35. A computer-readable medium having computer executable instructions stored therein, said instructions being executed by a computer, for performing the steps of claim 31.

36. A computer system for making probabilistic inferences based on a belief network so as to assist a user making a decision in a predefined decision-making field, comprising:
a processor; and
a storage device, connected to the processor and storing computer executable instructions and a data structure, the data structure storing a belief network, the belief network probabilistically relating a plurality of different input variables to a plurality of different output decisions, the belief network having a directed acyclic graph with nodes and arcs reflecting relationships between the nodes, each node having a decision graph containing a probability, at least one of the decision graphs having a plurality of paths to the probability of the at least one decision graph;
wherein the processor, in response to the executable instructions:
receives a request containing a value for one of the nodes, and accesses the directed acyclic graph with the value of the one node to perform probabilistic inference so as to select one of the output decisions and provide the one output decision as output.

37. The computer system of claim 35 wherein the directed acyclic graph is cyclic.

38. A method for forming an enhanced version of a belief network for subsequent use in assisting a user, through computer-aided probabilistic inferences, in a decision-making process, the method being implemented in a computer system having a processor and a storage device connected to the processor, wherein the storage device stores computer executable instructions and a data structure, the data structure storing the enhanced version of the belief network, the method comprising the steps, implemented by the processor through execution of the instructions, of:

receiving an initial version of the belief network with nodes and arcs indicating relationships between the nodes, each node containing a graph with probabilities;

adjusting one of the graphs to improve an ability of the one graph to perform probabilistic inference, the graph indicating a relationship among the nodes of the belief network that is not reflected in the initial version of the belief network; and adjusting the initial version of the belief network to reflect the indicated relationship so as to generate the enhanced version of the belief network.

39. A computer-readable medium having computer executable instructions stored therein, said instructions being executed by a computer, for performing the steps of claim 38.

40. A method for forming an enhanced version of a belief network for subsequent use in assisting a user, through computer-aided probabilistic inferences, in a decision-making process, the method being implemented in a computer system having a processor and a storage device connected to the processor, wherein the storage device stores computer executable instructions and a data structure, the data structure storing the enhanced version of the belief network, the method comprising the steps, implemented by the processor through execution of the instructions, of:

receiving an initial version of the belief network with nodes and arcs indicating relationships between the nodes, each node having an associated graph containing probabilities;

for each of the nodes:
adjusting the associated graph to create candidate graphs;
scoring each candidate graph to determine goodness at performing probabilistic inference; and
identifying which one among the stored candidate graphs is a best graph with a greatest score among the stored candidate graphs; and whenever the best graph contains a probabilistic relationship between the input variables and output decisions that does not exist in the initial version of the belief network, updating the initial version of the belief network by storing within each of the nodes in the initial version of the belief network the associated candidate graph that is the best graph for said each node so as to yield the enhanced version of the belief network.

41. A computer-readable medium having computer executable instructions stored therein, said instructions being executed by a computer, for performing the steps of claim 40.

* * * * *